US012670200B2

(12) United States Patent
Lehal et al.

(10) Patent No.: US 12,670,200 B2
(45) Date of Patent: Jun. 30, 2026

(54) CLAUSE TAXONOMY SYSTEM AND METHOD FOR STRUCTURED DOCUMENT CONSTRUCTION AND ANALYSIS

(71) Applicant: CLAUSEHOUND INC., Toronto (CA)

(72) Inventors: Rajah Singh Lehal, Toronto (CA);
Joshua Neil Koudys, Toronto (CA);
Gregory Davis O'Grady, St. Marys
(CA)

( * ) Notice: Subject to any disclaimer, the term of this patent is extended or adjusted under 35 U.S.C. 154(b) by 144 days.

(21) Appl. No.: 18/250,328

(22) PCT Filed: Apr. 6, 2022

(86) PCT No.: PCT/CA2022/050527
§ 371 (c)(1),
(2) Date: Apr. 24, 2023

(87) PCT Pub. No.: WO2022/213197
PCT Pub. Date: Oct. 13, 2022

(65) Prior Publication Data
US 2023/0401247 A1       Dec. 14, 2023

Related U.S. Application Data

(60) Provisional application No. 63/171,611, filed on Apr. 7, 2021.

(51) Int. Cl.
*G06F 16/35*       (2025.01)
*G06F 16/332*      (2025.01)
(Continued)

(52) U.S. Cl.
CPC ............ *G06F 16/35* (2019.01); *G06F 16/383* (2019.01); *G06F 40/205* (2020.01); *G06F 40/40* (2020.01)

(58) Field of Classification Search
CPC ...... G06F 40/30; G06F 40/284; G06F 40/289; G06F 16/93; G06F 40/279; G06F 40/205;
(Continued)

(56) References Cited

U.S. PATENT DOCUMENTS 8,788,523 B2    7/2014   Martin et al.
9,792,277 B2   10/2017   Srinivasan
(Continued)

FOREIGN PATENT DOCUMENTS

CN      112270223 A      1/2021
EP       3399432 A1     11/2018
WO    2019217999 A1     11/2019

*Primary Examiner* — Olujimi A Adesanya

(57) ABSTRACT

A system and method for clause and clause cluster classification for structured document analysis, interpretation, annotation, versioning and construction. The system and method can analyse one or more structured documents and parse the documents by clause, and assign each clause a clause category and clause cluster category. The clauses of similar structured documents can then be compared and documents can be flagged for variance in clause text, clause content, and the presence or absence of clauses in expected categories for the document type. By organizing clauses and clause language in a digital platform, the present system is capable of rapid document analysis and presentation of like clauses and related clause and clause cluster information for expediting document drafting, version tracking, and document analysis.

20 Claims, 12 Drawing Sheets

(51) Int. Cl.
*G06F 16/383* (2019.01)
*G06F 40/205* (2020.01)
*G06F 40/40* (2020.01)

(58) Field of Classification Search
CPC .... G06F 40/166; G06F 40/131; G06F 40/242;
G06F 16/345; G06F 16/367; G06F
40/186; G06F 40/20
See application file for complete search history.

(56) References Cited

U.S. PATENT DOCUMENTS

| | | | | |
|---|---|---|---|---|
| 9,996,528 | B2 | 6/2018 | Gidney | |
| 10,162,850 | B1* | 12/2018 | Jain | G06F 40/30 |
| 10,395,325 | B2 | 8/2019 | Takuma et al. | |
| 10,445,698 | B2 | 10/2019 | Hunn | |
| 2008/0306784 | A1 | 12/2008 | Rajkumar et al. | |
| 2011/0055206 | A1* | 3/2011 | Martin | G06F 40/289 |
| | | | | 707/723 |
| 2013/0047069 | A1* | 2/2013 | Lee | G06F 16/93 |
| | | | | 715/230 |
| 2014/0289176 | A1* | 9/2014 | Zhang | G06N 20/00 |
| | | | | 706/12 |
| 2015/0106276 | A1* | 4/2015 | Clark | G06Q 50/18 |
| | | | | 705/311 |
| 2015/0106378 | A1* | 4/2015 | Clark | G06F 16/353 |
| | | | | 707/740 |
| 2015/0106385 | A1* | 4/2015 | Clark | G06F 40/169 |
| | | | | 707/748 |
| 2015/0106880 | A1* | 4/2015 | Clark | H04L 63/102 |
| | | | | 726/4 |
| 2016/0070693 | A1* | 3/2016 | Carrier | G06F 16/3329 |
| | | | | 707/755 |
| 2016/0132798 | A1* | 5/2016 | Picard | G06Q 10/0631 |
| | | | | 705/7.28 |
| 2016/0188568 | A1 | 6/2016 | Srinivasan | |
| 2019/0005049 | A1 | 1/2019 | Mittal et al. | |
| 2020/0013022 | A1 | 1/2020 | Lewis et al. | |
| 2020/0311353 | A1* | 10/2020 | Li | G06N 3/088 |
| 2020/0327172 | A1* | 10/2020 | Coquard | G06F 16/9035 |
| 2022/0261711 | A1* | 8/2022 | Krishna | G06F 16/353 |
| 2022/0405336 | A1* | 12/2022 | Lippe | G06F 16/9535 |
| 2022/0414153 | A1* | 12/2022 | Slattery | G06F 18/40 |

* cited by examiner

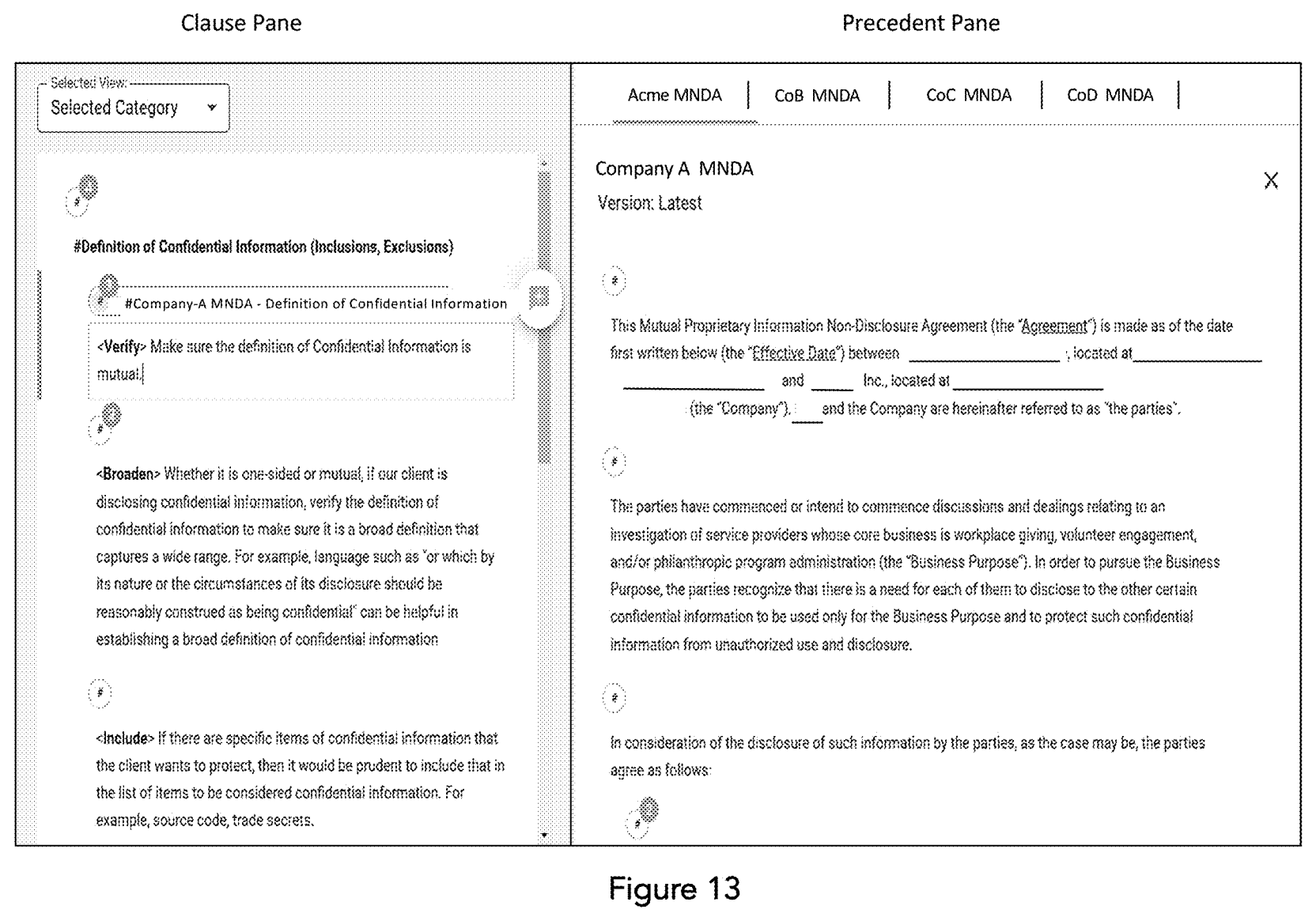

Clause Pane

Precedent Pane

✕

Selected View:
Selected Category ▾

Definition of Confidential Information (Inclusions, Exclusions)

⚫ #Company-A MNDA - Definition of Confidential Information

<Verify> Make sure the definition of Confidential Information is mutual.

<Broaden> Whether it is one-sided or mutual; if our client is disclosing confidential information, verify the definition of confidential information to make sure it is a broad definition that captures a wide range. For example, language such as "or which by its nature or the circumstances of its disclosure should be reasonably construed as being confidential" can be helpful in establishing a broad definition of confidential information:

<Include> If there are specific items of confidential information that the client wants to protect, then it would be prudent to include that in the list of items to be considered confidential information. For example, source code, trade secrets.

| Acme MNDA | CoB MNDA | CoC MNDA | CoD MNDA |

Company A MNDA
Version: Latest

This Mutual Proprietary Information Non-Disclosure Agreement (the "Agreement") is made as of the date first written below (the "Effective Date") between _____ ; located at _____ and _____ Inc. located at _____ (the "Company") ___ and the Company are hereinafter referred to as "the parties".

The parties have commenced or intend to commence discussions and dealings relating to an investigation of service providers whose core business is workplace giving, volunteer engagement, and/or philanthropic program administration (the "Business Purpose"). In order to pursue the Business Purpose, the parties recognize that there is a need for each of them to disclose to the other certain confidential information to be used only for the Business Purpose and to protect such confidential information from unauthorized use and disclosure.

In consideration of the disclosure of such information by the parties, as the case may be, the parties agree as follows:

Figure 13

CLAUSE TAXONOMY SYSTEM AND METHOD FOR STRUCTURED DOCUMENT CONSTRUCTION AND ANALYSIS

CROSS-REFERENCE TO RELATED APPLICATIONS

This application claims priority to United States provisional patent application U.S. 63/171,611 filed 7 Apr. 2021, and is a United States National Stage application under 35 U.S.C. 371 of PCT Application No. PCT/CA2022/050527, filed on 6 Apr. 2022, the contents of both of which are hereby incorporated by reference herein in its their entirety.

FIELD OF THE INVENTION

The present invention pertains to a system and method for clause and clause cluster classification for structured document construction and analysis using clause taxonomy. The present invention also pertains to the categorization of clauses in documents, in particular in legal documents and contracts, and the presentation of clause categorization for document analysis, interpretation, annotation, versioning, and construction.

BACKGROUND

Natural language processing (NLP) uses computer algorithms to parse the contents of text and can be used to parse and classify the textual context of the language within documents. Text classification can be used to assign labels, tags, or categories to segments of natural language, for example, paragraphs, sentences, phrases, or words, and can be used to categorize textual sections of or whole legal documents, court cases, reports, scientific papers, online text, and other documents. Machine learning has shown promising results when used in the field of natural language processing (NLP). Deep-learning architectures such as deep neural networks (NNs), deep belief networks, convolutional neural networks (CNNs), and recurrent neural networks (RNNs) have been used for various NLP tasks including speech recognition, natural language processing, sentiment analysis, information retrieval, and machine text translation. Legal documents in particular are typically formally structured with certain clauses occurring in documents of the same type. However, legal contracts themselves are highly variable in language and content, and the nuanced use of language in contracts can have serious and significant effects, sometimes unintended and unexpected, for those bound by the contract. Other document types such as estimates, proposals, and sales agreements can have similarly recurring clauses, especially between documents in similar areas of business, natural language processing can assist in the analysis of these types of documents.

In one example of clause groupings detection, U.S. Pat. No. 9,996,528 to Gidney describes an electronic documents verification system which detects related contracts and analyzes contents in related contracts by identifying clauses and extracting features including references or descriptions within each contract to establishes linkages of the related contracts based on the extracted features.

Risks can exist in legal contracts in particular when the contract contains loopholes that result in illegality or unenforceability. In addition, contracts can introduce procedural risk, such as by introducing inadequately researched or improperly or unclearly defined terms or clauses, which may result in failure to comply with external (regulatory) or internal (contractual) requirements, and negotiation risk, which can result in a failure to secure the best terms for parties. Contracts are complex legal documents and jurisprudence and legal practice can change, which can have implications on legal agreements.

Legal teams are often overwhelmed with enterprise contracts that can be hundreds of pages each and constructing these complex documents can be painfully slow. Manually reviewing hundreds of pages of legal writing at a time can be error prone and can lead to mistakes and omissions, especially with clerks and junior lawyers. The process of document construction and analysis can also be extremely laborious, and finding key information in precedent agreements, redlining, escalating, and negotiating clauses is becoming unmanageable with the sheer volume of legal documents in large organizations. In addition, legal teams are expensive, and their time can be better spent on valuable work like negotiating than on knowledge management.

There remains a need for a system and method for clause and clause cluster classification in documents and document databases for use in smart and efficient document construction and analysis.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for clause and clause cluster classification for document construction and analysis. Another object of the present invention is to provide a system and method for clause analysis in documents for smart document analysis, interpretation, annotation, versioning and construction.

In an aspect there is provided a computer-implemented method for structured document analysis comprising: parsing a plurality of clauses from a structured document, each clause comprising clause text and a clause taxonomy comprising contextual metadata and extrinsic metadata associated with each clause, the parsing comprising using natural language processing of the clause text and a multidimensional mapping of the clause taxonomy to provide a vector description of each clause defining a relationship between clause taxonomy and clause text; classifying the plurality of clauses by clause cluster by comparing the vector description of the clause to vector descriptions of other clauses and clause clusters in a clause library; and displaying, on a graphical user interface, a particular clause in the structured document next to at least one clause from the clause library with a similar vector description and in the same clause category as the particular clause along with the contextual metadata and extrinsic metadata relevant to the at least one clause from the clause library.

In an embodiment, the method further comprises before parsing, segmenting the structured document into a plurality of clauses.

In another embodiment, the method further comprises classifying the structured document by document category and matching each clause in the structured document to a standard clause category in the document category.

In another embodiment, segmenting a structured document into a plurality of clauses separated clauses by identifying one or more of a carriage return, comma, semi colon, period, conjunction, paragraph structure, and other punctuation.

In another embodiment, parsing each of the plurality of clauses is done using word to vector analysis to identify vector based clauses and clause clusters in the structured document.

In another embodiment, the method identifies the absence of one or more clause categories in the structured document.

In another embodiment, the method further comprises identifying a clause variant that presents a potential risk in the structured document and providing an alert to the potential risk on the graphical user interface.

In another embodiment, the method further comprises tracking versioning of each clause to previous versions of the same clause by comparing the clause with previous variants having similar extrinsic metadata or intrinsic metadata.

In another embodiment, the method further comprises performing a gap analysis between at least one of the plurality of clauses or clause clusters in the structured document and similar clauses and clause clusters in the clause library of classified clauses and clause clusters.

In another embodiment, the structured document is a legal document, contract, sales proposal, policy document, agreement, court case, report, scientific paper, or online text.

In another embodiment, the method further comprises identifying clause variants by identifying one or more weak clauses in the structured document and matching the weak clause to a standard clause based one or more organization rule, legal decision, and legal jurisprudence.

In another embodiment, the method further comprises editing clause text of one of the plurality of clauses in the structured document and updating the clause taxonomy of the clause based on the editing.

In another embodiment, the extrinsic metadata associated with each clause comprises one or more of an occurrence of particular language, misuse of language, clause category occurrence, type of document, importance of document, inconsistencies within document, internally conflicting language, a conflict situation within clauses in the document, a conflict situation between clauses in the document, clause category, legal precedents, external comments on the clause, external history of use of the clause, gap analysis of potentially missing clauses or clause clusters, and clause variants.

In another embodiment, the contextual metadata for each clause comprises one or more of firm identification, author identification, editor identification, editing timestamp, drafting timestamp, clause edit history, document location, internal discussion, comments, answers, escalations, rule development, comparing against a rule, internal approval of the clause, internal disapproval of the clause, notes on improvements to be made to that clause, and document occurrence identification.

In another aspect there is provided a system for constructing a structured document comprising: a clause library comprising a plurality of clauses classified by clause category and clause clusters classified by cluster category, each clause and clause cluster comprising a clause taxonomy comprising contextual metadata and extrinsic metadata associated with each clause; a clause parsing engine comprising a natural language processing algorithm for parsing clauses and clause clusters to provide a vector description of the clause comprising one or more vector expressions defining the relationship between words in the clause; a clause matching engine for matching parsed clauses and clause clusters to similar clauses and clause clusters in the clause library using clause and clause cluster taxonomy and the vector description of the clauses and clause clusters; and a graphical user interface for displaying a structured document deconstructed into clauses and clause clusters in the document and similar clauses and clause clusters from the clause library to identify clause variants along with contextual metadata and extrinsic metadata relevant to the at least one clause from the clause library.

In an embodiment, the clause taxonomy, contextual metadata, and extrinsic metadata for each clause in the clause library provide a multidimensional clause map for each clause and clause cluster in the clause library.

In another embodiment, each clause and clause cluster has one or more document type that the clause and clause cluster can be applied to.

In another embodiment, identifying variants further comprises identifying one or more weak clauses in the document by matching the weak clause to an internal standard document, external document, or legal jurisprudence.

In another embodiment, the system identifies the absence of one or more clause categories in the document and clause variants that presents a potential risk in the document.

In another embodiment, the system further comprises a translation database matching each of the plurality of clauses with clauses having the same intent in another language.

In another aspect there is provided a system for structured document analysis comprising: at least one processor; and at least one non-transitory memory storing instructions that, when executed by the at least one processor, cause the system to perform operations comprising: parsing a plurality of clauses from a structured document, each clause comprising clause text and a clause taxonomy comprising contextual metadata and extrinsic metadata associated with each clause, the parsing comprising using natural language processing of the clause text and a multidimensional mapping of the clause taxonomy to provide a vector description of each clause defining a relationship between clause taxonomy and clause text; classifying the plurality of clauses by clause cluster by comparing the vector description of the clause to vector descriptions of other clauses and clause clusters in a clause library; and displaying, on a graphical user interface, a particular clause in the structured document next to at least one clause from the clause library with a similar vector description and in the same clause category as the particular clause along with the contextual metadata and extrinsic metadata relevant to the at least one clause from the clause library.

In another aspect there is provided a method for structured document analysis comprising: segmenting the document into a plurality of clauses, each clause comprising clause text and a clause taxonomy comprising metadata associated with each clause; identifying a clause category for each of the plurality of clauses using natural language processing of the clause text; classifying each of the plurality of clauses by clause cluster by comparing the clause taxonomy to taxonomy of similar clauses and clause clusters in a clause library, each clause cluster directed to a cluster category; and identifying variants between each of the plurality of clauses and clause clusters and the similar clauses and clause clusters in the clause library.

In an embodiment, the method further comprises classifying the document by document category.

In another embodiment, the natural language processing separated each clause from other clauses by recognizing one or more of a carriage return, comma, semi colon, period, conjunction, and punctuation.

In another embodiment, identification of clause variants identifies gaps in the document.

In another embodiment, the method further comprises displaying the plurality of clauses, clause clusters, and similar clauses and clause clusters from the clause library.

In another embodiment, the method identifies the absence of one or more clause categories in the document.

In another embodiment, the method identifies a clause variant that presents a potential risk in the document.

In another embodiment, the method further comprises tracking versioning of each clause to previous versions of the same clause by comparing the clause with previous variants having similar metadata.

In another embodiment, the method further comprises tracking versioning of each clause cluster to previous versions of the same clause cluster by comparing the clause cluster with previous variants having similar metadata.

In another embodiment, the similar metadata comprises the same firm identification, author identification, clause category, or document occurrence identification.

In another embodiment, the method further comprises gap analysis between a clause and clause cluster and similar clauses and clause clusters in the clause library of classified clauses and clause clusters.

In another embodiment, the method further comprises amending the clause and clause cluster and storing the amended clause and clause cluster in a version history.

In another embodiment, the document is a legal document, contract, sales proposal, policy document, agreement, court case, report, scientific paper, or online text.

In another embodiment, identifying variants further comprises identifying one or more weak clauses in the document by matching the weak clause to one or more standard, rule, decision, and legal jurisprudence.

In another embodiment, the method further comprises editing clause text of one of the plurality of clauses in the document and updating the clause taxonomy of the edited clause based on the editing.

In another embodiment, the metadata associated with each clause comprises one or more of an occurrence of particular language, misuse of language, firm identification, author identification, editor identification, editing timestamp, drafting timestamp, clause category occurrence, clause edit history, document location, type of document, importance of document, inconsistencies within document, internally conflicting language, a conflict situation within clauses in the document, a conflict situation between clauses in the document, gap analysis of potentially missing clauses or clause clusters, and associated variants.

In another embodiment, the method further comprises suggesting an edit to a clause based on the identified variants.

In another embodiment, the metadata for each clause further comprises internal discussion, comments, answers, escalations, rule development, comparing against a rule, internal approval of the clause, internal disapproval of the clause, notes on improvements to be made to that clause, and document occurrence identification.

In another aspect there is provided a system for constructing a structured document comprising: a clause library comprising a plurality of clauses classified by clause category and clause clusters classified by cluster category, each clause and clause cluster comprising a clause taxonomy with associated metadata; a clause parsing engine comprising a natural language processing algorithm for parsing clauses and clause clusters; a clause matching engine for matching parsed clauses and clause clusters to similar clauses and clause clusters in the clause library using clause and clause cluster taxonomy and metadata; and a graphical user interface for displaying a document and clauses and clause clusters in the document and similar clauses and clause clusters from the clause library along with clause metadata to identify clause variants.

In an embodiment, the clauses are grouped by clause cluster, each clause cluster belonging to the same clause category.

In another embodiment, each clause and clause cluster has one or more document type that the clause and clause cluster can be applied to.

In another embodiment, identifying variants further comprises identifying one or more weak clauses in the document by matching the weak clause to a standard or legal jurisprudence.

In another embodiment, the method identifies the absence of one or more clause categories in the document.

In another embodiment, the method identifies a clause variant that presents a potential risk in the document.

In another embodiment, the metadata associated with each clause comprises one or more of an occurrence of particular language, misuse of language, firm identification, author identification, editor identification, editing timestamp, drafting timestamp, clause category occurrence, clause edit history, document location, type of document, importance of document, inconsistencies within document, internally conflicting language, a conflict situation within clauses in the document, a conflict situation between clauses in the document, gap analysis of potentially missing clauses or clause clusters, clause-related comments, and associated variants.

In another embodiment, the system further comprises a translation database matching each of the plurality of clauses with clauses having the same intent in another language.

In another aspect there is provided a method for structured document construction comprising: assigning a document category to the structured document; and providing a plurality of clause clusters from a clause library, each clause cluster comprising a plurality of variant clauses, each clause comprising clause text and a clause taxonomy comprising metadata associated with each clause, each of the plurality of clause clusters and clauses having metadata associated with the document type.

In another aspect there is provided a computer-implemented method for structured document analysis comprising: segmenting a structured document into a plurality of clauses, each clause comprising clause text and a clause taxonomy comprising contextual metadata and extrinsic metadata associated with each clause; parsing each of the plurality of clauses in the structured document using natural language processing of the clause text to provide a vector description of the clause comprising one or more vector expressions defining the relationship between words in the clause; classifying each of the plurality of clauses in the structured document by clause cluster by comparing the vector description of the clause and clause taxonomy to clause taxonomy and vector description of clauses and clause clusters in a clause library, each clause cluster directed to a cluster category; and displaying, on a graphical user interface, a particular clause in the structured document next to at least one clause from the clause library in the same clause category as the particular clause with contextual metadata and extrinsic metadata relevant to the at least one clause from the clause library.

BRIEF DESCRIPTION OF THE FIGURES

For a better understanding of the present invention, as well as other aspects and further features thereof, reference is made to the following description which is to be used in conjunction with the accompanying drawings, where:

FIG. 13 is an example graphical user interface showing clause metadata and analysis in a Mutual Nondisclosure Agreement (MNDA).

DETAILED DESCRIPTION OF THE INVENTION

Figure 1:
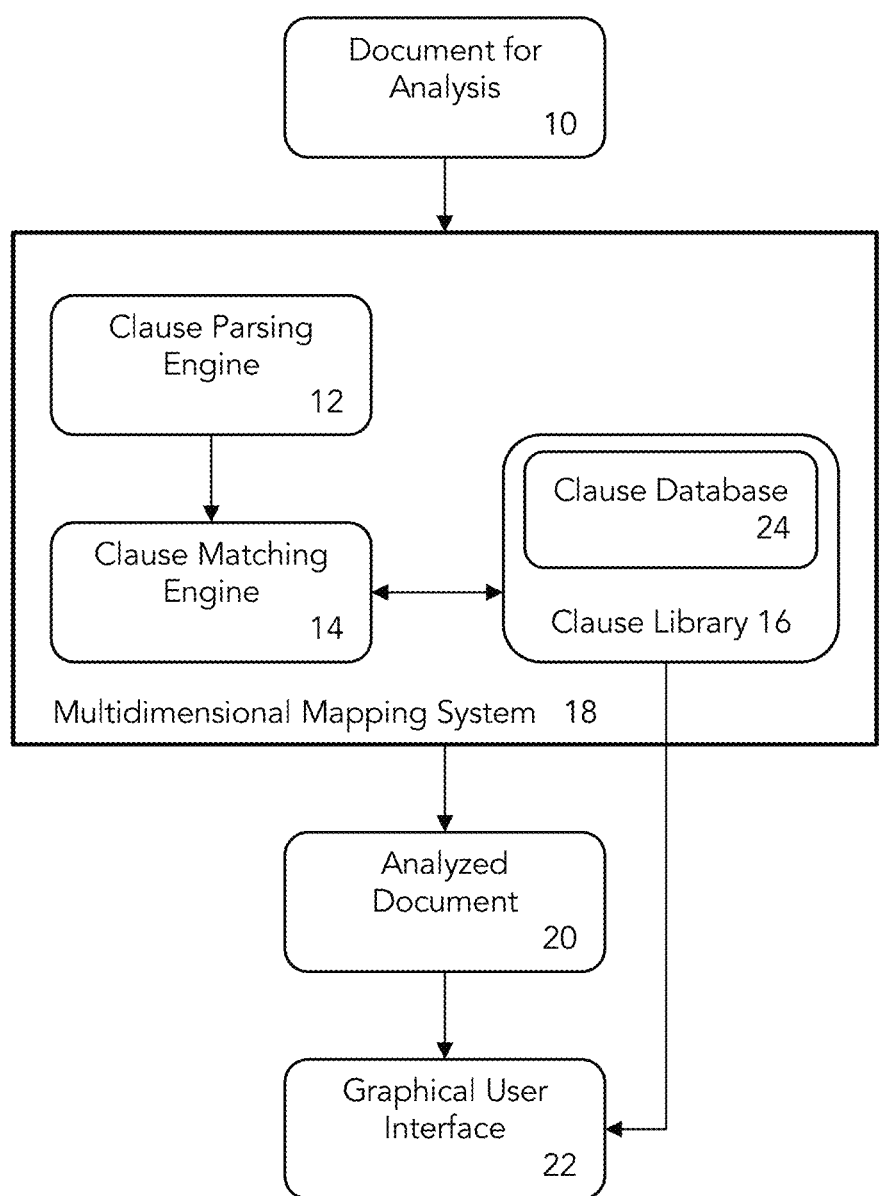
FIG. 1 is a system diagram and flowchart for document analysis using the present method and system.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate. As used herein, the terms "comprising," "having," "including" and "containing," and grammatical variations thereof, are inclusive or open-ended and do not exclude additional, unrecited elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "clause" refers to a fraction, segment, or vector description of a section of text comprising one or more words or one or more vector expressions defining the relationship between words in that segment or section. Clauses generally have a theme or topic and can be classified into clause categories using this theme. In documents clauses can be numbered to indicate the relationship to other clauses in the document, and/or can have titles or headings identifying the clause type or theme. The clause, which can be identified with a clause parsing engine using a natural language processor or by a word to vector analysis, can be used to identify the clause category to which the clause belongs.

As used herein, the term "clause cluster" refers to a cluster of one or more clauses that are grouped by clause category. A structured document generally comprises one or more clause clusters.

As used herein, the term "clause category" refers to a theme or subject to which a clause, clause cluster, or group of clauses pertains. The clause category or clause category title can also serve as a metadata tag for clause classification for a clause or set of clauses in a document.

As used herein, the term "clause cluster" refers to a collection or group of clauses that each have meaning on its own, but can be grouped together according to theme or type and share a clause category. The collective cluster of clauses or clause cluster provides an overall theme or scope that captures the elements and intents of the clauses in the group.

As used herein, the term "clause taxonomy" refers to the set of classification data and metadata associated with a clause or clause cluster. The clause taxonomy of a clause or clause cluster can be used to provide intelligence on historical as well as future clause use of the clause or clause cluster by providing the context of use of the clause or clause cluster in documents. In one embodiment, the taxonomy of a clause comprises a clause category and clause cluster category for the clause, and the combination of contextual metadata and extrinsic metadata, as well as the clause intention or meaning, and use context. The association of clauses and clause clusters with a set of clause taxonomy metadata provides a mappable library of clauses and clause clusters for clause analysis.

Herein is described a system and method for clause and clause cluster classification for document analysis, interpretation, annotation, versioning, and construction. The present system can analyse one or more documents and parse the documents by clause cluster and individual clause and assign each clause a clause cluster and clause category. The clause clusters and clauses of similar documents can then be compared and categorized and displayed on a graphical user interface, and documents can be flagged for similarity as well as variance in content, as well the presence or absence of clauses in expected categories by document type. By organizing clause clusters, clauses, and clause language in a digital platform the present system is capable of rapid document analysis and presentation of like clauses in similar documents for expediting, for example, structured document drafting, version tracking, and legal analysis.

The present system and method assists legal departments master clause use in legal documents by providing precedent comparisons between internal documents in the organization, as well as external precedent documents from external sources. In this way legal drafters can have at-hand access to a plurality of clauses of similar type with metadata and guidance on why the clause was drafted the way it was as each clause is being drafted in order to deeply inform the construction and analysis of legal documents. In this way legal document drafters can draft contracts clause by clause, using legal knowledge and precedent specific to the particular clause they are considering. By displaying similar clauses side-by-side on a graphical user interface legal document drafters can focus exclusively on the clause at hand with relevant knowledge and precedents to inform their drafting. Drafting documents by using and modifying existing clauses while being presented with legal background and rationale on word meaning and use in each clause expedites commercial document review and increases confidence in the starting point of the constructed document prior to thorough review by lawyers.

The present system and method provides workflow efficiency by displaying, on a graphical user interface, relevant clauses from similar documents, alongside legal commentary pertaining to the terms and meanings in each clause for legal deconstruction during document analysis and drafting, enabling versioning, commenting, and clause history use by document type and context to empower the drafting of structured documents. The identification of the relevance of certain terms and phrases in clauses, as well as presenting the text of similar clauses with alternative terms or wording with variation in meaning and scope, provides options for changing the meaning and scope of the clause. Providing one or more precedent clauses in other legal documents augments the legal context available to the document drafter provides additional considerations for the document drafter as well as legal clause precedents for tailoring the clause to the specific case required by the document being drafted.

Historical reporting and analysis of clause and clause cluster use and context can provide additional knowledge to structured document and contract drafters to guide clause and language selection based on the specific requirements and limitations that the document is intended to serve, and for version tracking. By providing a history of clause and clause cluster use, language use, context, and legal analysis, both over time between documents of the same type and through the history of an organization or a particular negotiation, the present system and method supports the drafting of up-to-date and strong clauses and clause clusters in documents, contract, proposals, and other agreements to satisfy modern legal and compliance requirements, as well as the analysis, understanding, and management of existing documents.

The present system and method can be used in the analysis and construction of a variety of documents including but not limited to legal contracts, government policy documents, sales proposals, contracts, policy documents, agreement work estimates, project descriptions, research dissertations, form generation generally, and other documents. The present system and method sets out standard drafting options for frequently used and required clauses and clause clusters within standard and structured documents, contracts, and agreements as well as provides common variants and justification for the selection of use of the variants. In use, structured documents can be drafted more quickly and from a more informed position, and the resulting documents are improved in consistency and accuracy. In addition, documents can be analysed and checked for consistency with internal and external standards and across use cases, as well as for changes in practice and the law over time.

FIG. 1 is a system flowchart for structured document analysis using the present method and system. The present system and method parses a structured document into clauses and clause clusters, and employs clause taxonomies and associated metadata to classify clauses and clause clusters to find like clauses and clause clusters in other documents. In the document for analysis 10, a multidimensional mapping system 18 is engaged to attach metadata to the document as well as each clause and clause cluster in the document so that the document can be analysed as a whole, as well as clause by clause, and cluster by cluster. The multidimensional mapping system 18 comprises a clause parsing engine 12 to identify clauses in text, a clause matching engine 14 to match the identified clause to similar clauses in a clause library 16 and a clause database 24 comprising a library of previously classified clauses from other documents. The clause database 24 comprises the set of previously analyzed and classified clauses, and the clause library 16 comprises the clause database 24 and all of the associated metadata and clause and clause cluster taxonomy associated with each clause.

In use of the system, a structured document for analysis 10 is presented to the system so that each clause in the structured document can be parsed and assigned with a clause category and associated metadata to provide a multidimensional mapping of each clause and clause cluster in the document. Classification of each clause and clause cluster in the document for analysis 10 into a clause category is done based on previously recognized clauses and clause clusters identified using natural language processing by a clause parsing engine 12. The clause parsing engine 12 identifies natural language and/or vector based clauses and clause clusters in each document for analysis 10 and then presents the set of one or more identified clauses and clause clusters to a clause matching engine 14 such that the same can be mapped to an appropriate clause category. The identification of a clause and clause cluster can also be done based on a previously identified set of clauses and clause clusters from a clause database 24 in the clause library 16 by comparing the clauses and clause clusters in the clause database 24 to clauses and clause clusters and/or natural language strings in the clause and clause cluster being analysed. Each clause in the document for analysis 10 is mapped to one or more clauses and clause clusters in the clause database 24, and identification of clauses and clause clusters under analysis provides a mapping and mapping accuracy analysis to one or more clause categories.

Structured documents such as legal documents, agreements, and contracts generally have a cascading clause organizational structure or segmentation structure where each clause is separated from other clauses by, for example, a carriage return, comma, semi colon, period, conjunction, or other punctuation, or presented in a new paragraph structure which is often numbered or otherwise annotated as such. Many clauses in a structured document also often have a title or introductory phrase which identifies the nature or intention of the clause, and these titles can also be used to classify each clause and clause cluster in the document being analysed. In the clause library 16, clauses and clause clusters in the clause library 16 are classified by category, and each clause category holds associated metadata in the clause library 16 to identify the clause category based on corresponding data, including assignable metadata tags. In one example, if a clause comprises the textual clauses "intellectual property", "made, conceived, or acquired", and "background knowledge", the clause matching engine 14 will classify the clause in a category with clause category description of 'background intellectual property'. Each clause and clause cluster in the document for analysis 10 is then categorized such that clauses and clause clusters can be matched by the clause matching engine 14 to identified clause categories. Parsing documents into clause types or categories enables comparison of similar clauses and clause clusters across multiple documents by matching of identified clauses and clause clusters to clauses and clause clusters, or other associated metadata in like clauses and clause cluster in the clause library 16. Once the document has been analysed the analyzed document 20 can be presented to a user in a graphical user interface 22 alongside, for example, the matched clauses and clause clusters, similarly structured documents of a similar document category, and/or other intelligence that will enable a user to make smart use of clause tracking and analysis.

Taking a clause-centred approach to document textual analysis enables machine learning systems to identify and classify clauses and clause clusters by category or type, linking relevant sections across multiple documents and document types. Sorting the documents and matching each clause and clause cluster by clause and clause cluster type can also enable historical analysis of clauses and clause clusters both in a private organization database and provide a report on versioning as well as clause language trends over time and the reasoning therefor. Interactive clause analysis also provides additional information for contract or document drafts enabling "smart contract" capabilities where documents are informed by modern legal precedent as well as organization standards.

Figure 2:
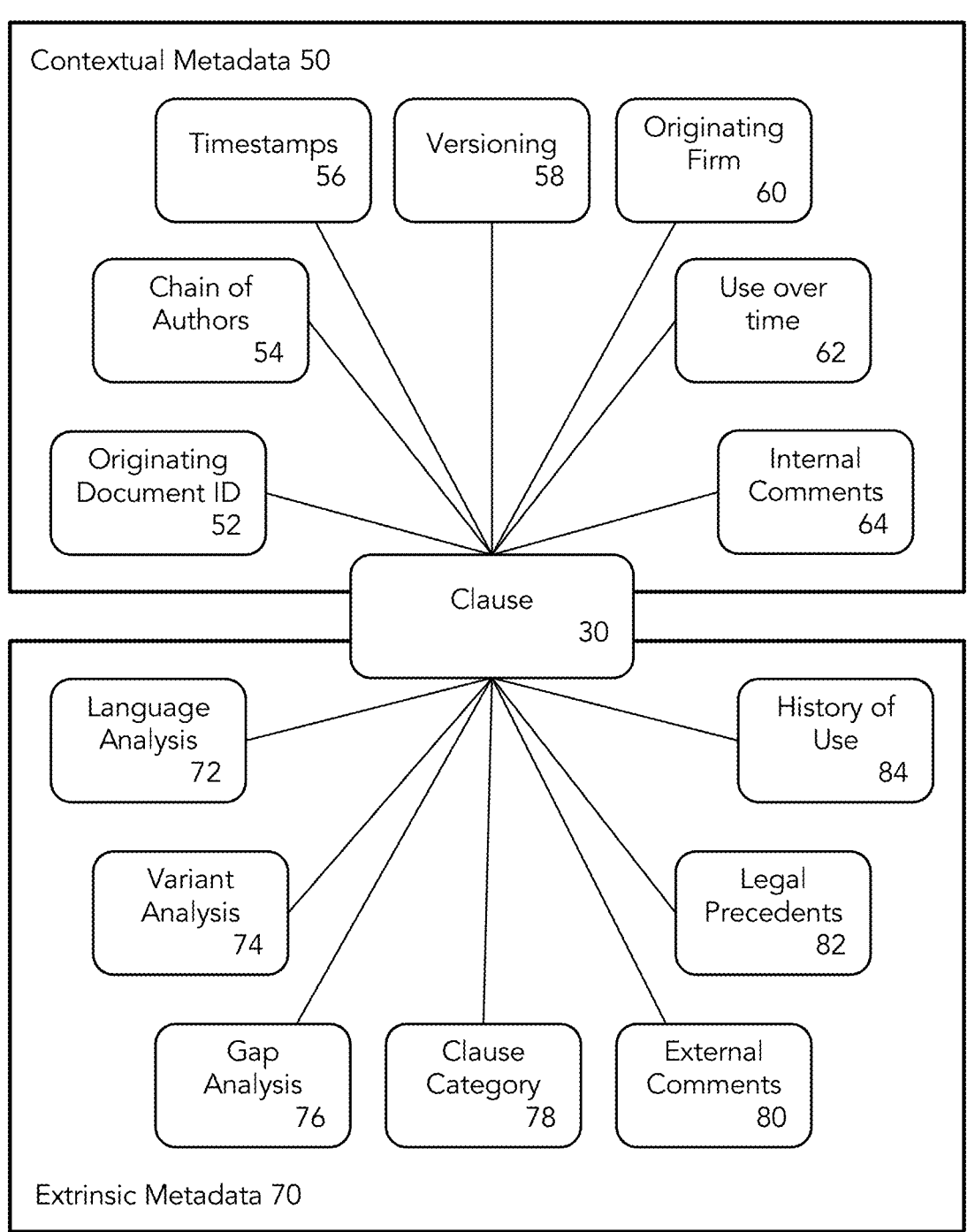
FIG. 2 is a multidimensional clause map of associated metadata including extrinsic metadata and contextual metadata.

FIG. 2 is a multidimensional clause map or clause taxonomy of metadata, particularly extrinsic metadata and contextual metadata. Clause metadata and clause cluster metadata can be used to classify, analyse, and map each clause and clause cluster in a structured document to provide downstream intelligence to the use of the clause and clause cluster, and guidance for structured document construction. Each clause and clause cluster in a document is tagged with both extrinsic metadata and contextual metadata, the sum of which make up a multidimensional clause map for each clause and clause cluster. The clause map, or sum of metadata associated with each clause and clause cluster, guide the overall clause analysis as well as document analysis and enable informed contract and document analysis, revision, and drafting. A clause taxonomy comprises the map of multidimensional metadata associated with the clause and clause cluster that can be used to provide intelligence on historical as well as future clause use. The taxonomy of a clause 30 can be thought of as comprising a combination of contextual metadata 50, extrinsic metadata 70, in addition to the clause intention or meaning. The association of clauses and clause clusters with a set of clause taxonomy metadata provides a multidimensional mappable library of clauses and clause clusters for clause analysis that can be used through a graphical user interface for partial and whole document analysis and drafting.

In a large organization with a multitude of contracts, documents, and agreements, the same or similar clause and clause clusters may be used and changed over time in various documents, and tracking the use and modification of the clause and clause cluster is informative for consistency and accuracy, as well as legal control of the organization. Contextual metadata is data pertaining to the incidence of use and modification of the clause and clause clusters, or documents in which the clause and clause clusters can be found in an internal database of documents, and can include comparisons between the clause and clause clusters, and other clauses and clause clusters used in an organization, and/or comparisons between the containing document or other related documents and other internal documents. Contextual metadata also comprises data and analysis related to the clause and clause clusters that is not the specific language of the clause and clause clusters, and can exist as information directly attached to the clause and clause cluster, for example a timestamp, or information attached indirectly through association with neighbouring or containing elements, such as connections with other clauses and clause clusters, or containing associated documents. Some examples of contextual metadata 50 tagged to a clause 30 include but are not limited to originating document identification 52, chain of authors 54, timestamps 56 for each use and/or revision, versioning 58 including internal changes over time and revisional history, originating group 60 or department or firm, use over time 62 such as incidence and frequency, and internal comments 64 such as relating to recommendations for use and/or modification.

Specific metadata that can be associated with a clause or clause cluster can also include but is not limited to jurisdiction the document was authored in, document importance, known issues with the clause, updates required, mathematical or vector differences compared with other clauses in the same or similar taxonomy, internal or external approval or disapproval ratings, and number of uses of the same or similar clauses in other documents. Yet other examples of particular metadata can include occurrence of particular language, misuse of language, firm identification, author identification, editor identification, editing timestamp, drafting timestamp, clause category occurrence, clause edit history, document location, type of document, importance of document, inconsistencies within document, internally conflicting language, a conflict situation within clauses in the document, a conflict situation between clauses in the document, gap analysis of potentially missing clauses or clause clusters, and associated clause variants.

In one example, a legal clause and clause cluster in a contractor agreement may have been re-written subsequent to new jurisprudence or updated legal practice, however the older language may exist in current contractor agreements. The knowledge of which existing contractor agreements in the organization contain the older non-updated clause and clause cluster language is important to know by organizational team members whether in a large organization, or by small businesses or sole entrepreneurs, who will want to be aware of the legal implications, specifically for risk reduction, that resulted in the change of clause and clause cluster language. Small businesses especially also may not be aware of modern or updated language for structured documents or the liability that outdated language or clauses and clause clusters, in such documents presents. To address these challenges, the present system can ingest and organize all clauses in past agreements in order to create a map of all agreements that contain the specific clause that is now outdated and provide an updated standard clause or set of clause rules based on the clause update. The complete library of clauses and clause clusters can serve not only as an identification tool for outdated clauses and but also as a library of insights of expert questions embedded into thousands of clauses and clause clusters that are frequently used by these organizations, comparisons against other clauses, and notes on clauses that have been determined to be outdated, etc. The layered knowledge database that the present system provides can also assist with guidance for each clause and clause clusters ingested by the software individually, or processed en masse by a data connection when integrated with an organization's own document system such as Dropbox™, Google™ Drive, SharePoint™, etc. when connected, to provide a rapid analytical snapshot of an organization documents, access to the library of insights, and for the purpose of identifying potential risks in the organization and providing an alert to structured document drafters to be aware of and avoid a known potential risk.

Extrinsic metadata 70 is data pertaining to the language and variants analysis within a particular clause category and/or document category in an extra-organizational landscape. Structured documents and their associated clauses and clause clusters are used and changed broadly across many different types of organizations, both public and private, and broad tracking of clause use with tagged metadata pertaining can provide guidance to the best use of certain clauses and clause clusters and clause language during document construction. In one example, documents in a particular document category will be known to contain a standard set of clause clusters and standard clause categories in each clause cluster. The addition or absence of a clause category to a structured document that is different from a standard structured document in the same document category can potentially introduce legal risk. An alert to the structured document drafter of this deviation from a standard in the same document category can reduce the risk and expedite arrival at an acceptable legal document.

In particular, comparison of a single structured document to others in the same document category at a clause level can provide intelligence on, for example, use and misuse of language, firm identification, author identification, editor identification, editing timestamp, drafting timestamp, clause category, clause edit history, document qualities such as location, type of document, importance of document, inconsistencies, internal conflicting language or situations, and gap analysis of potentially missing clauses and clause clusters, reviewing variants, applying an edit, seeking discussion, comments, or answers (escalations), developing a rule, comparing against a rule, approval or disapproval of that clause, notes on improvements to be made to that clause, and document occurrence identification. Some examples of extrinsic metadata 70 tagged to a clause 30 include but are not limited to language analysis 72, variant analysis 74 and use pattern thereof, gap analysis 76, clause category 78, external comments 80, relevant legal precedents 82, and history of use 84. Extrinsic data can be further anonymized such that clauses and their associated metadata and document structure can be shared outside the organization without revealing the origination of the clause or document but still provide the intelligence needed by other organizations to select clauses specific to a use case. In a database comprising many thousands of documents across different organization types and sizes, and from different countries, clause tracking can provide best practice recommendations for a broad audience while maintaining drafter and originating organization anonymity.

The present system and method invention is capable of ingesting and categorizing clauses and clause clusters such that it can develop document construction and analysis rules and logic for an end-user. For example, if a user uploads various versions of the non-disclosure agreement that has been executed by the user, the present system and method can immediately categorize the clauses and clause clusters and perform a gap and variant analysis of the uploaded documents. With the information gathered from the gap and variant analysis, the present system and method is able to identify commonly used clauses and clause clusters, for which rules can be developed for the drafting of one or more new standard non-disclosure agreements for the user.

A clause 30 also has intrinsic meaning that comes from the language of the clause and clause cluster itself, however the meaning of a clause and clause cluster can change over time based on, for example, legal jurisprudence, and disputes over clause and clause cluster language can bring to light issues that a structured document drafter will want to be aware of when drafting a new document. The combination of contextual metadata 50 and extrinsic metadata 70 provides a multidimensional clause map for each clause and clause cluster in the clause library, and the addition of clauses and clause clusters and their associated metadata to the clause library enriches the information in the clause library that can be brought forward during document analysis and drafting. The result is a more informed document or contract that has taken into account more information than a single person or even single organization could arrive at using their own document drafting history. By compiling clauses, clause clusters and their associated metadata into a clause and clause cluster taxonomy, both contextual metadata 50 and extrinsic metadata 70, and making the same available for rapid document analysis and presentation of like clauses and clause clusters for expediting document drafting, version tracking, and legal analysis. Auto-tagging of documents and clauses and clause clusters using contextual metadata 50 and extrinsic metadata 70 in this manner allows document drafters the benefit of an encyclopedia worth of information which is presented in the moment that they are drafting documents. The present innovation in auto-tagging documents provides a multidimensional mapping for each clause and clause clusters in a document and then presents the most relevant information for document analysis and drafting.

Figure 3:
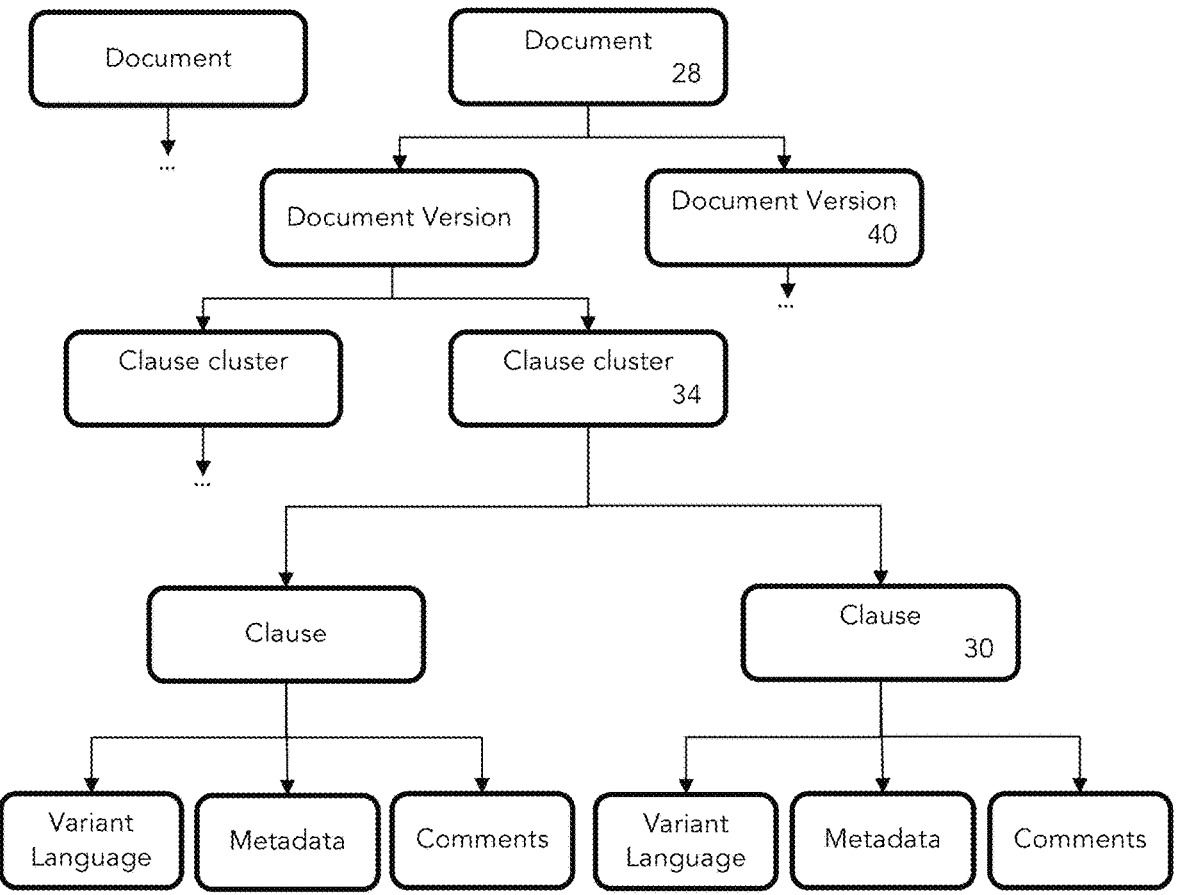
FIG. 3 is a clause taxonomy tree illustrating metadata layers of a clause in a document.

FIG. 3 is a clause taxonomy tree illustrating taxonomic metadata layers of each clause in a document. The system of relationships between clauses within and between clause clusters and documents defines a clause taxonomy. Documents in an organization are constructed and edited over time, and each version can be tagged with a timestamp to identify the last edit as well as the author who created and/or edited the document, which is recorded as contextual metadata associated with the clause. This contextual data identifies the clause provenance including the document(s) associated with each clause, as well as version tracking of the clause, and originating document over time. Each clause can also belong to a cluster of clauses that are all related to the same general theme and have further document type associations that express similarity of clauses and clause clusters to one another in a category based on document type. Each clause cluster can also have one or more parent clause clusters and one or more child clause clusters depending on the structure of the clause cluster.

In one example, the clause cluster 34 in a legal structure document "background intellectual property" can be in a cluster category of "intellectual property" which may also contain related other clause categories such as "foreground intellectual property" (more related) and "licensing" (less related). Any given document 28 can have a document category and document version 40, and may have one or more clauses in the same cluster, or no clauses in a particular cluster category. The system of relationships between clauses 30 within and between clause clusters 34 and document 28 where the clause clusters reside defines a clause cluster taxonomy. Each clause is placed in a clause category and/or cluster category, and the relationship to other clauses in the clause cluster 34 and outside the cluster can also be determined and mapped. Each clause cluster 34 can also have variant language based on the document it derives from, author, timestamp, organization, or intention, which can further provide clause categorization based on clause cluster variants. Additionally each clause 30 can comprise, as part of the clause taxonomy, comments and other associated metadata as previously described.

Further, documents can be generally classified by document type or document category on the basis of clause and cluster categories present in the document. In one example, the text of a residential lease agreement document may have clause categories including "bedrooms", "casual guest", "appliances", and "pets" that will positively identify the document as a residential lease agreement document type. The present system and method is also capable of comparing clause clusters versus clause clusters in other documents and displaying the same to a user. Historically only documents that were based on the same originating document were comparable, however in the case of the present system, two sales proposals, for example, can be compared against each other to confirm the scope of work based on the clause cluster categorization of clauses as scope of work, providing the reader with comparable content immediately from within the database without having to open dozens or hundreds of comparable files.

The present system can also comprise a translation database matching each of the plurality of clauses with clauses having the same intent in another language. In an example, if a user was to upload an agreement to the present system, each clause and clause cluster of the document agreement will be assigned a category in accordance with the shown clause taxonomy tree. The categorization is determined by the scope and purpose of the clause content. The present system and method is capable of immediately identifying contract-specific language after each clause and clause cluster is assigned a clause category, also creating a link between the recently categorized clause and clause cluster with the wide variety of variant languages that have also been previously assigned to the same category. This can be particularly useful for users who are looking for a direct translation of the legal clauses and clause clusters, especially in a bilingual country such as Canada. If a user tried to run the clauses and clause clusters of a contract through a commonly used translation tool such as Google Translate, what they would receive is a bunch of nonsensical language that represents an entirely different intention. This issue arises because much of the language used in the clauses and clause clusters of a contract have a unique definition that is not the same definition under colloquial English. The translation tool and translation database can provide users with a translation of the clause and clause clusters under its traditional definition and according to the intent of the clause and clause cluster. The present system and method is able to prevent this issue since the system has classified and categorized the language of each clause and is able to suggest other variant language in the other language that is more aligned with the intent of the clause. Users are able to swap the clause and clause clusters with different variant clauses and clause clusters that can help provide a more accurate and suitable translation. Thus if a user uploads a document to the system, each clause in the document would be assigned a clause category, which opens access to the translation database comprising at least one variant in the other language that has been previously assigned to the same category. This can be pertinent, for example, for users who are looking for a translation of the language into other languages on their organizational website compared to using a standard translation tool which would supply a simple translation that may capture a different intent. The end-user's translation can be stored, along with associated metadata to the variant language, within the clause database and clause library, and deliverable to the end-user website dynamically through an Application Programming Interface (API) connection. Usage rules and nuances can also be centrally administered and applied for use in, for example, a specific geographic location. The end-user can also centrally, dynamically and immediately administer, swap, recall, audit, or update the language based on changes to changes in local rules or nuances, with updated language delivered dynamically to the end-location, for example in a user website, marketing materials, or otherwise.

Figure 4:
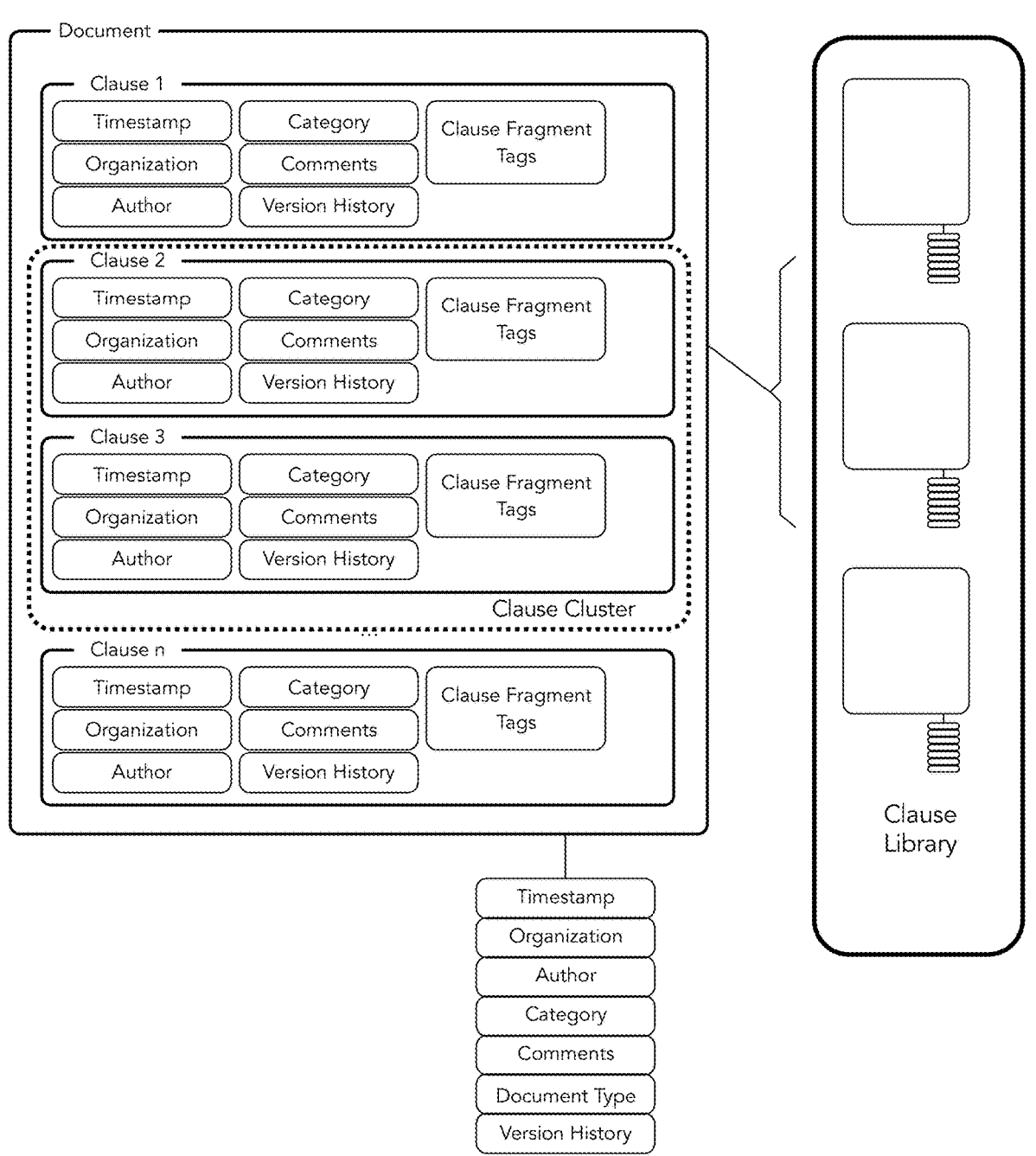
FIG. 4 is an illustration of whole document analysis using multidimensional metadata associated with clauses in the document.

FIG. 4 is an illustration of a whole document clause-based analysis using multidimensional metadata associated with clauses and clause clusters in a structured document. Structured documents such as, for example, legal documents, contracts, sales proposals, and agreements are made up of a plurality of clauses and clause clusters and can be stored along with relevant clause and clause cluster taxonomy in a clause library. The present system and method can deconstruct these types of structured documents into clauses and clause clusters, and assign multidimensional metadata to each clause and clause cluster in the document such that the document, clauses and clause clusters therein can be easily compared to other similar documents, clauses and clause clusters. Each of the plurality of clauses and clause clusters in the structured document, as well as each instance of each clause and clause cluster, carries its own unique set of associated metadata describing the history, classification, and use of the clause and clause cluster. The clause-associated metadata can include, for example, history timestamps, organization use history, authors, clause category or categories, user comments including legal analysis, clause tags, and version history. The structured document that the clause and clause cluster is in also carries its own set of associated metadata, which can be similar to or entirely different from the metadata fields associated with each individual clause and clause cluster. Unique metadata fields for the document may include, for example, document type, author and editor names, geographic location of drafting date of first drafting, number of times the document has been used in the organization, number of similar documents across the organization, version history including last update and update frequency, and other metadata that describe the document itself. As stated herein, one of the main strengths of the present system and method is its capability to keep record of various versions of an agreement, and the changes that had been made for each version. This function provides a great level of convenience when two parties are working to draft an agreement together. Currently in most settings, different versions of the documents are created every time each side makes a revision to the agreement, and that new version is then sent to the other side. This creates confusion and leads to an inefficient drafting process since it is difficult to keep track the changes that had been made over time. The present system eliminates this issue since both parties are able to make revisions on one common agreement, and also make references to a particular revision in the past, by referring to the version number and the time the revision was made. This gives clarity for users since all the information can be found in one location.

The multidimensional metadata associated with each clause and clause cluster includes some or all of the metadata of each of the related layers in the clause taxonomy. Individually and taken together the metadata associated with each clause and clause cluster in the clause taxonomy represents a knowledge structure that supports the creation of tools to aid in the creation, analysis, understanding, and management of clauses and clause clusters and the structured documents that contain them. In a whole document analysis, clauses and clause clusters in the structured document are identified by clause category and can be displayed in a graphical user interface by clause category based on similarity to other known clauses and clause clusters in the same category. Similarity analysis and selection of close clauses and clause clusters can also include analysis of similarity of originating document type, geographical or jurisdictional application of the document, bias of the author when drafting contemplating level of risk associated with the clause, rules applied by the author when drafting, and organization type that the document is intended to serve.

Clusters can also have one or more separated clauses, or be comprised of a single paragraph that contains one or more clauses. Clusters can also have parent clusters and child clusters. All clauses in a cluster can be pulled into a document under construction as a single clause cluster, or each clause can be selected and displayed separately. Children and parent clusters and clauses can also be pulled together into a document as desired. In a structured legal document example of type or document category "family-_law", examples of document subtypes or document subcategories which contain one or more clause clusters can include, for example, "family_divorce", "family_estate", "family_will", and "family_trust". In the analysis of structured documents such as legal documents and legal agreements, text classification using clause and clause cluster classification brings forward high similarity clauses, or clause clusters, in high similarity document types such that clauses and clause clusters that may appear in the same document type can be compared.

In one general example, general contracts have similar clause types tags which can include but are not limited to, clausecategory_preamble, clausecategory_identificationofparties, clausecategory_recital, clausecategory_definition, clausecategory_exchangeofvalue, clausecategory_obligations, clausecategory_representations, clausecategory_warranties, and clausecategory_conditions. Documents can also contain boilerplate clauses and clause clusters such as choice of law, assignment, and entire agreement (merger) clauses and clause clusters that are specific to parties, relationship of parties, jurisdiction, or other connection. In one specific example, an employment agreement will have a standard set of clauses and clause clusters that cover the legal obligations of employee and employer and satisfy local and national labor laws. Typical clauses or clause clusters that occur in standard employment contracts can include but are not limited to terms of employment, employee responsibilities, employee benefits, employment absence, dispute resolution, nondisclosure agreements, intellectual property agreements, ownership agreements, assignment clauses, employment opportunity limitations, and grounds for termination. Contract documents also often incorporate by reference other documents, appendices, laws, and standards into the agreement and make intra-document references to one another. In another structured document type example, a sales proposal would have a standard set of clauses or clause clusters which includes introduction to the vendor, vendor offering, vendor scope of work, vendor assumptions, vendor pricing, vendor credibility, vendor references, etc.

Clauses and clause clusters in a document can be compared and related by measuring similarity and differences between contextual metadata and extrinsic metadata. New clauses and clause clusters can also be compared against clauses and clause clusters in the clause database with similar taxonomy, associated metadata, or clause contents to glean contextual information and meaning by the use and metadata associated with similar clauses and clause clusters in the same or similar category in the same or similar document type. In a situation where a user is interested in analysing a group of documents, the documents can be selected en masse and compared with a set of documents already in the database which comprises the clause library. The documents can be analysed and then compared against other documents of a similar or same type or against a specific document for clause analysis and document comparison. Another scenario entails a user selecting a clause, clause cluster, or clause from a document to compare against a group of similar documents to see how the clause and clause clusters has been used including degree of similarity, frequency of use, or changed over time i.e. versioning. Yet another scenario entails a user drafting a document, and automatically receiving clause type and/or specific clause and clause cluster suggestions during the drafting process, with the clause suggestions automatically determined based on a group of similar clauses and clause clusters and/or similar documents. For example, a document manager may be trying to develop best practices language and can look for language that is identical, highly similar, or completely different within a clause category or cluster category, and with this discovery, can develop best practices rules for that language.

Figure 5:
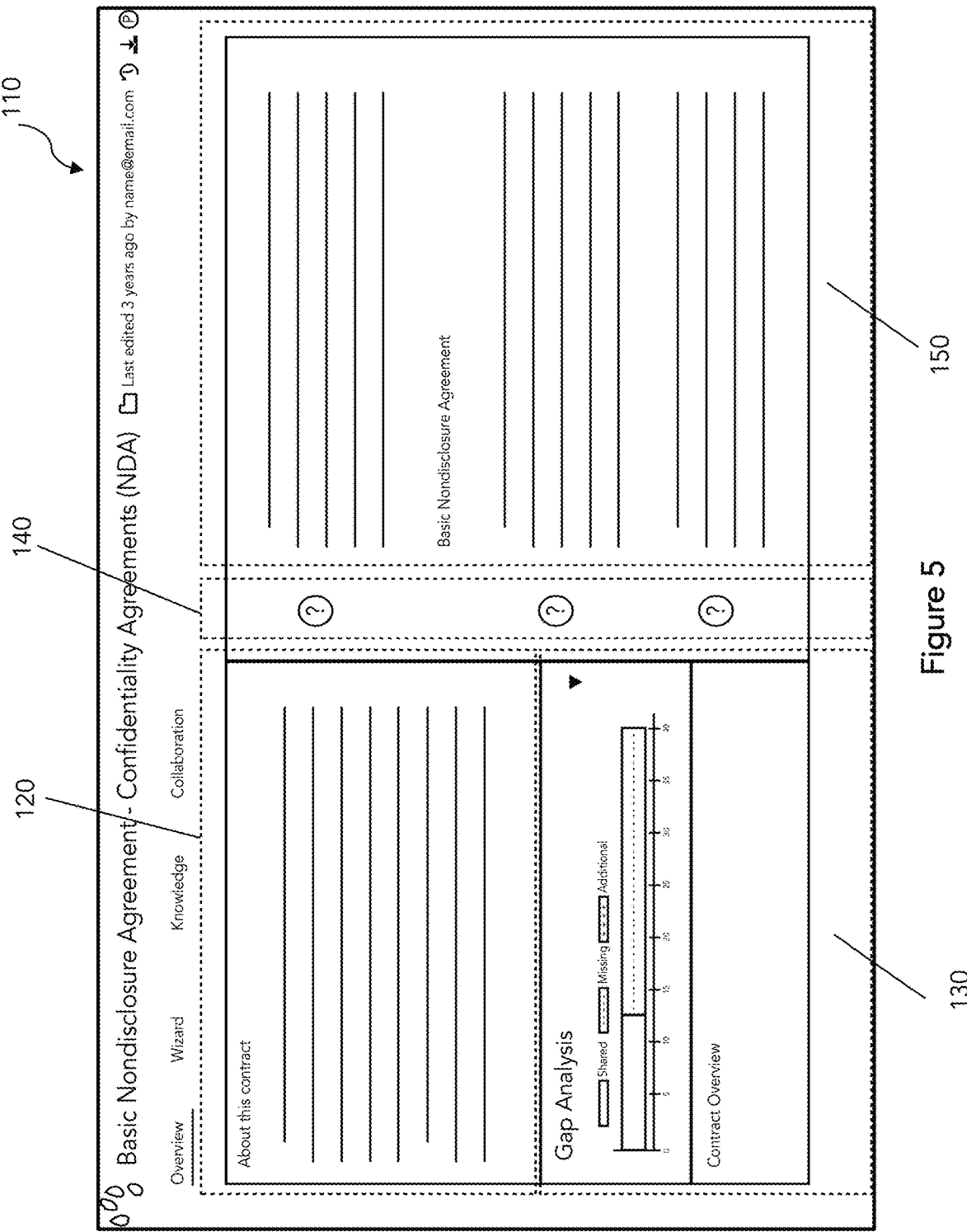
FIG. 5 is an illustration of a graphical user interface of a document analysis in an example non-disclosure agreement.

FIG. 5 is an illustration of an example of a graphical user interface that can be used in a document analysis in an example non-disclosure agreement. In this example, a document drafter can select a particular document, for example a 'Non-Disclosure Agreement' from an existing document set, and the system can provide an analysis of the document based on the contents therein after document processing by the clause mapping system. The graphical user interface provides an easy to use digital platform to display, animate, and organize clause language in a document under analysis or construction. In one embodiment, the clause-based construction and analysis of a document is performed through a web interface and is provided as a "platform as a service" (PaaS). The PaaS format can be dropped into existing workflows to simplify integration into existing operating procedures, and includes import and export functions to support this. The PaaS can be accessed through a graphical user interface (GUI) 110, and also through an application programming interface (API). Through the API connection, the structured data underlying the GUI can be queried directly. For integration into existing frameworks, it is possible to connect through the API integration to current document management systems. Through the GUI, a user can create a new or open an existing document. A document is displayed in the document panel of the GUI 110. Information about the document and its containing clauses and clause clusters, including document metadata can be available through the other parts of the dashboard, for example in a document guidance panel 120, to provide guidance about the type of document in general. A document taxonomy panel 130 provides guidance about the clause content of the document compared to prior versions and other documents of interest, which imparts at-a-glance information about clauses and clause clusters shared with similar documents, including missing (gap analysis) and additional clauses and clause clusters. Each clause and clause cluster is also assigned a tag cluster that is available through the tag cluster panel 140 associating the clause and clause clusters with other similar clauses and clause clusters of the same category in the system clause library.

The document guidance panel 120 provides useful tools for the creation, analysis, understanding, and management of clauses, clause clusters and documents include those that find differences between documents of interest and give information about the impact of those differences. This information may include analysis of alterations, insertions or deletions of clauses and clause clusters, or portions thereof based on the type, structure, and presence or absence of similar clauses and clause clusters, or clauses determined to be related through comparisons to the clause and document taxonomies. A gap analysis tool in a clause knowledge panel 150 can identify absent or duplicated clauses and clause clusters in the document under analysis or construction compared to standard documents of the same type to identify missing clauses and clause clusters or missing language normally found in documents of the same type. The gap analysis tool can also identify duplicate clauses and clause clusters as well as clauses and clause clusters with older language where insertion of an up-to-date version in the same clause category may offer stronger protection or clearer language. Information about clause and clause clusters differences may include additional elements such as version history, expert comments, jurisprudence, etc. that enable a deeper understanding of each clause and clause cluster, its language, and clause use history.

Figure 6:
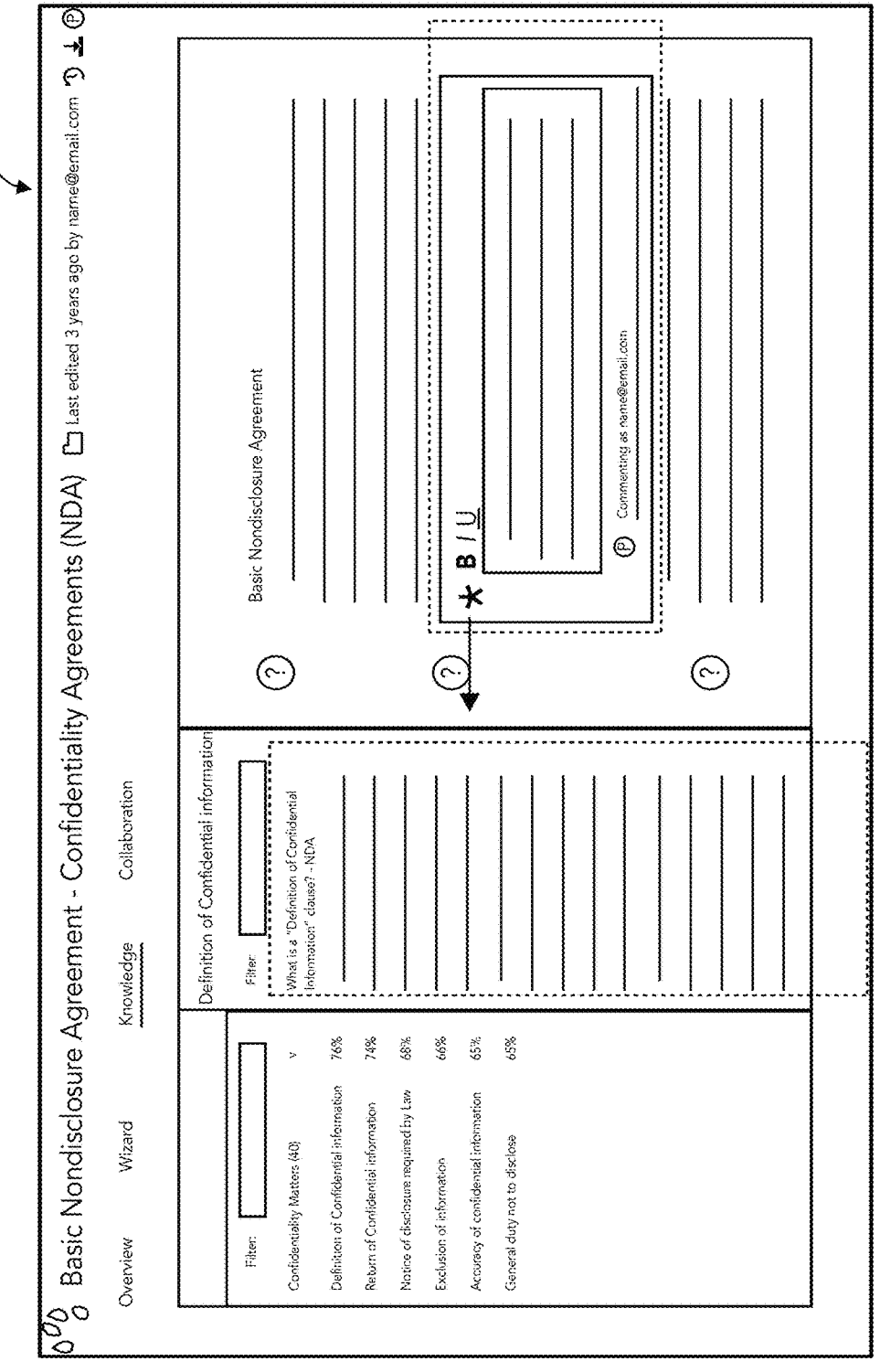
FIG. 6 is an illustration of an example of a graphical user interface that can be used in a document analysis.

FIG. 6 is an illustration of a graphical user interface (GUI) of a clause analysis 170 in an example non-disclosure agreement using the present system. Clicking on the tag cluster can open additional panels that contain information about the clause and clause cluster, including weighted category assignments suggestions, guidance about the category of clause and clause clusters, or other commentary, and editing field to enable editing of the clause and clause cluster. Additional options allow a user to, for example, show the edit history of the clause and clause cluster. Alternatively, a document-level history can be displayed to show all document revisions, which are tracked at the clause level. Document metadata is collected and can be selectively presented in a dashboard. In the GUI clauses and clause clusters are animated and hyperlinked to other relevant clauses and clause clusters as well as other knowledge in the knowledge database, enabling smart contract capabilities for legal drafters. The knowledge database can also connect with document management and learning management systems through API integrations, and preferably uses a representational state transfer (REST) web API protocol that facilitates the clause text classification.

Edit functionality enables the clause and clause cluster to be changed, and the clause history panel can show the differences between the current version of the clause and clause cluster and other versions. A timestamp, author identifier, and optional version id (which may be custom) can be attached to each edit for inclusion in the version history. The branching of version trees is supported, which can be used for example to create separate tracks for different customers with similar agreements. The editor can also include a commenting function, which enables the sharing of expert information and commentary about the clause and clause cluster. Comments can also be attached to the version history, enriching the version data with reasoning, which can save time in future revisions and also be used for training purposes. Comments are retained at the clause level, as well as the document level, preserving knowledge across all future contracts that contain the clause and clause cluster, or similar clauses and clause clusters. The commenting system also supports the direct embedding of customer communication; client comments can also retained centrally, effectively logging client needs and decision rationale for future reference. The annotated clause-based change history is available through the dashboard for audit.

The system can further be enabled to import client information and collect signatures for inclusion in a document. Client and author information can also be available for insertion into documents, for example a document template for a contract of interest. Client rules can also be added during the information gathering that act as constraints on clauses, and clause clusters or document construction. Client configured templates can also be easily constructed and globally modified across the client organization. For example, confidentiality obligations might be longer for senior positions, and the requirements for each position can be stored as rules. During document creation and analysis, a panel is available provided in the GUI that assesses the document against any client rules and flag deviations. The system can also have e-signature support for validation of final versions of documents.

The present system can be run in multiple systems at once and this allows the users to have their own separate database for each of their forms and contracts. This enables users to build valuable forms and contracts online without requiring a server. When this particular function is combined with the ability of the system to categorize clauses and clause clusters, automated contracts and forms and other structured documents can be created. For example, if a user uploads various versions of a non-disclosure agreement (NDA) that have been executed by the user, the system will immediately categorize the clauses and clause clusters in the NDA and perform a gap and variant analysis. With the information gathered from the gap and variant analysis, the present system is able to identify commonly used clauses and clause clusters, and any clauses and clause clusters that might be necessary or recommended to draft a new standard NDA for that user.

Organizations can also upload their own private library of content and/or library of documents. Centralized document construction tool can apply user's private logic and either privately stored or generally stored meta information such as clause usage to construct a resulting document from the centralized library of clauses and variants, which can be delivered to the user-desired location, such to a browser, DocuSign™, or other document library. This can completely unbundle the user from the hosting or administration of a document construction database, clause taxonomy, or clause library.

With blockchain taking on a prominent role in our society, the present system has the capability to take advantage of the potential of blockchain and to implement a smart contract function. As provided herein, the system is able to automate contracts and keep track of all the revisions made by the parties throughout the lifetime of the document, which can use blockchain for metadata tagging. If both parties upload past agreements that had been executed onto the system, the clauses and the clause clusters in the agreements will be categorized appropriately. Once the necessary analysis has been done on the agreements for both parties, the present system is able to calculate which clauses and clause clusters each party considers to be priority and generate smart contract triggering events. The present system and method is also able to keep track of past revisions to further increase the accuracy of determining the contractual priorities of each party. Determination of the priority of each clause or clause cluster to each party can be done by statistical analysis of the usage of each clause and clause cluster in the document library for each party. Clauses and clause clusters that have higher occurrence, higher word count, greater number of breadth of comments, or are found in more of the total number of documents are indications of those that the party values as higher priority.

For clauses that have an ongoing promise associated, for example a compliance requirement, reporting requirement or payment requirement, a trigger can be associated with it, for example an automatic notification of a summary of clauses that will trigger a requirement in the upcoming week for example, made possible by metadata associated to all similar clauses. En masse, the clause processing and matching can identify and calculate triggering requirements that are expected for a certain day, week, month or year, based on the date of the contract and language of the clause. Structured document types, such as Sharia Law and banking documents, can have clauses and clause clusters that comprise dependencies on one another, as well as on clauses and clause clusters in other document types. Ensuring consistency of commitments across documents and within documents by tracking associated metadata, such as signors and parties, and tracking those commitments can provide clarity and avoid conflict.

Figure 7:
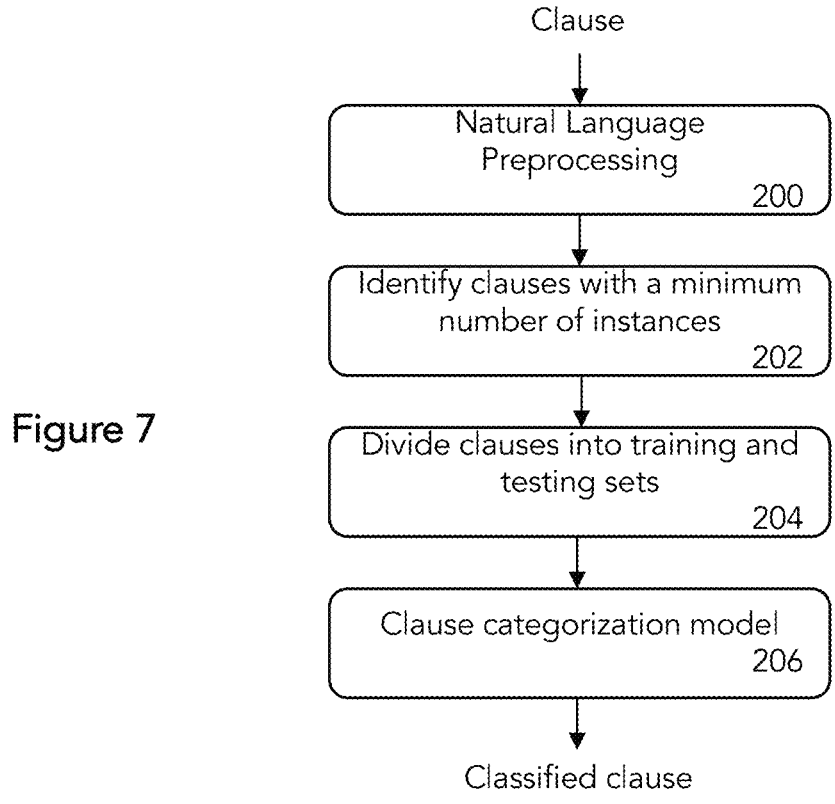
FIG. 7 is a flowchart of an example supervised learning model for clause and clause cluster classification in a clause parsing engine.

FIG. 7 is a flowchart of a supervised learning model for clause classification in a clause parsing engine. The machine learning method which can be used in clause parsing and classification in the present system and method uses natural language preprocessing 200 to parse a plurality of clauses in a plurality of documents to establish an accurately classified clause library. This enables the clause matching engine to categorize and match clauses in later documents based on the parsed clause tags and metadata in the trained clause library. The intrinsic meaning and identification of a clause may be ascertained and assigned by humans, however it quickly becomes inefficient and even humanly impossible to process the increasing amount of information that arises due to the existence and creation of new documents, items of jurisprudence, and items of law. It is therefore advantageous to introduce machine-based methods of clause interpretation and analysis for clause classification into clause categories using natural language processing and machine learning.

Various natural language processing methods exist that can interpret unstructured text. In one embodiment, the clause parsing engine uses a trained natural language processing model to accept a clause and clause cluster as input and outputs one or more category suggestions for that language and other related information. The clause parsing engine can use a text depth representation model to identify the clause and create, for example, a vector model of each clause, and then the similarity of clauses can be calculated based on the vector model and similar clauses can be searched and identified according to the similarity. The vector model may be initially trained, assigned, and/or checked by a person, however it has been found that the model quickly learns to accurately classify clauses and clause clusters, and the clause parsing engine used in the present system achieves a high level accuracy on clause matching for newly parsed clauses and clause clusters from new documents. Other machine learning models have also been used in the clause parsing engine including a Doc2vec model with a distributed or continuous bag of words configuration, a word2vec continuous bag of words model, and a convolutional neural network in a black box model, which all showed capability at clause parsing and clause category identification. In one example a preset corpus set can be obtained and word segmentation can be performed on a sentence in the corpus set. The learning preset original model according to a sentence after word segmentation can then be used to obtain the word2vec model. A variety of machine learning methods are known in the art and could be used to achieve the natural language processing and clause classification as herein described and those discussed are only a few of those available and known in the art.

Once natural language preprocessing 200 has been done on each categorized clause, duplicate clauses are removed to provide a unique set, keeping only the categories or clauses that meet a minimum number of instances 202 or unique clauses to be used in the neural network model. The clauses can then divided into training and testing sets 204 for input into the machine learning model. A clause categorization machine-learning model 206 is then implemented and iterated.

Figure 8:
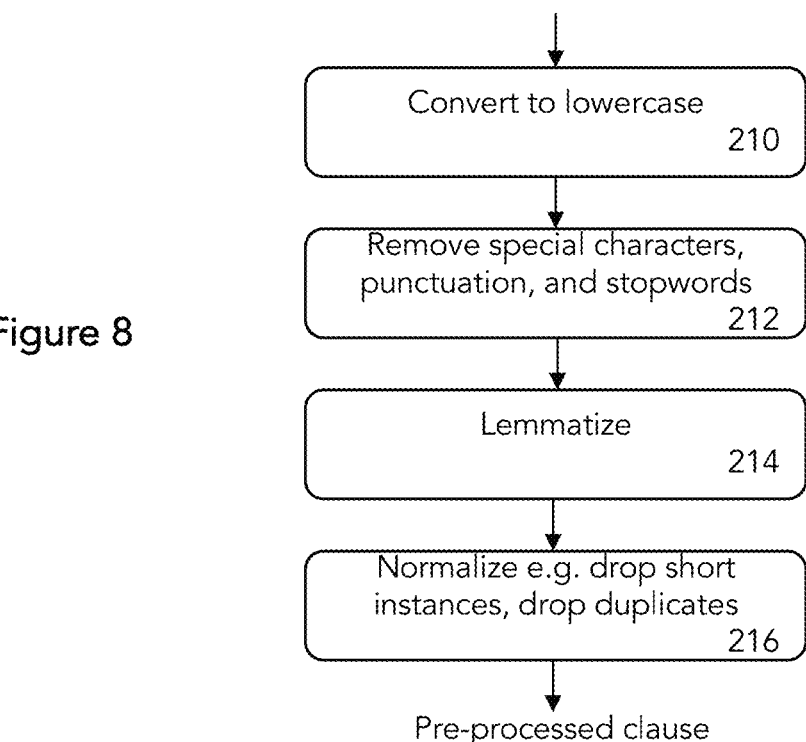
FIG. 8 is a flowchart of an example natural language pre-processing method.

FIG. 8 is an illustration of one example natural language preprocessing method in a supervised learning model for clause classification. In this method the clause is converted to lowercase 210 and special characters, punctuation, and stopwords are removed 212. The clause is then lemmatized 214 and then normalized to drop short instances and duplicates 216. The pre-processed clause is then input into the clause classification system for further processing. Other pre-processing modifications can also be done to the clause to prepare the clause text for machine learning categorization.

Figure 9:
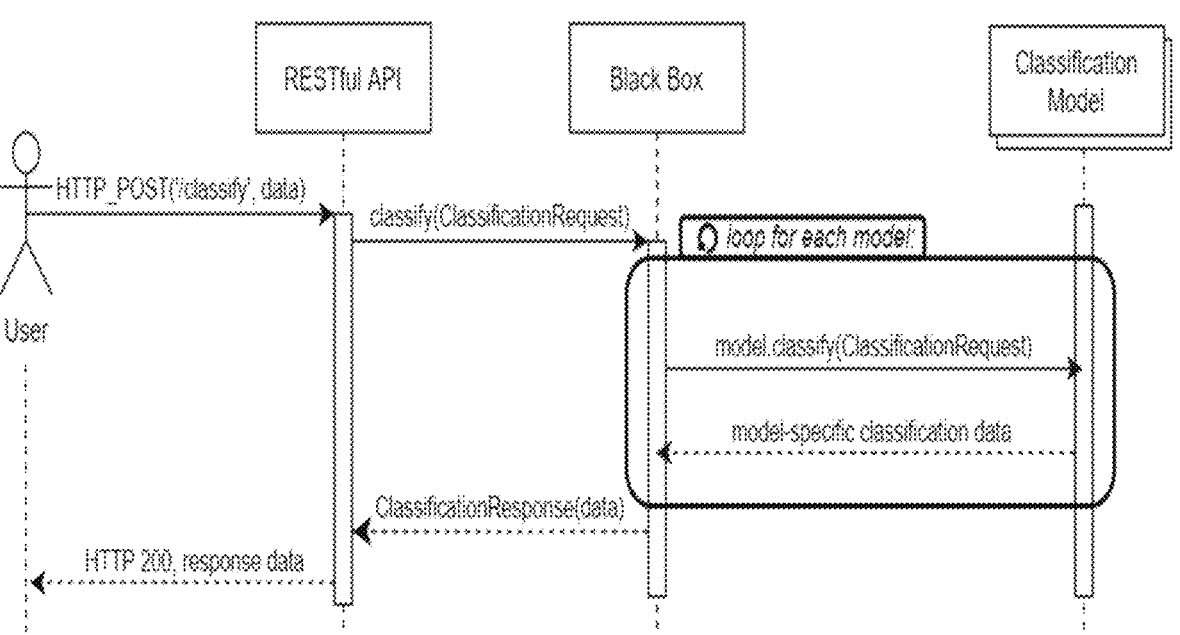
FIG. 9 is a sequence diagram of a natural language processing machine learning method which can be used in the present system and method.

FIG. 9 is a sequence diagram of a natural language processing machine learning method which can be used in the present system. Emergent machine learning applications in the legal field are capable of supporting or automating natural language processing (NLP) tasks that were traditionally manually performed by teams of legal experts and various natural language processing techniques can be used for the text classification of clauses. In the present case it has been found that use of a combination of pre-trained word vectors and neural networks is highly efficient at natural language processing and clause classification using artificial intelligence and machine learning. In the present case it has been found that a combination of pre-trained word vectors with a convolutional neural network is an effective technique for clause categorization. The NLP-based system used in the present system and method accepts clause language as input and outputs category suggestions for that language and other related information. The system is powered by modular, class-based representations of distinct text classification algorithms referred to as models. Each model separately processes the given clause and suggests one or more potential corresponding categories from the set it was trained on. The output REST API, which takes a clause segment as input provides one or more category recommendations for the clause as output, preferably also including clause segments similar to the input clause. This modular design allows the user to either compare classification results across multiple models, or to simply use the top model identified.

A text classification request for a single clause is provided to the system. This endpoint responds with a list of potential categories alongside any other supplementary information needed by a legal expert to manually validate the category suggestions. As more clause categories are entered into the database used to source each model's training dataset, it becomes periodically necessary to update this dataset and re-train each model. This process can also be fully automated through a script run periodically in a software environment at fixed times, dates, or intervals. The script can also be used for re-training and/or re-deploying the models when newer clauses were added to the dataset. After the automation script fetches and preprocesses the training data, it triggers model training. Each model can be ranked by accuracy, and each time the models are re-trained, the accuracy of each model is calculated and a sorting algorithm is used to rank each model from most to least accurate. All model objects are then serialized, compressed and given file names based on their rank. When processing classification requests, models with higher rank are prioritized.

In one example, cosine similarity can be computed amongst arbitrary vectors. Cosine similarity is a similarity measure, which can be converted to a distance measure, and then be used in any distance based classifier, such as nearest neighbor classification, where:

$$\cos\varphi = \frac{a \cdot b}{\|a\|\|b\|}$$

where a and b are the two vectors being compared. For a NN classification, a would be the new document and b is the sample document. The new document a is then classified based on the most similar sample document(s) b. K-means clustering can then be used, which is a method of vector quantization that aims to partition n observations into k clusters in which each observation belongs to the cluster with the nearest mean (cluster centers or cluster centroid) to serve as a prototype of the cluster can also be used to categorize clauses. By distributing a sufficiently small set of vectors to the client-side, cosine similarity is a fast method for matching similarity across a diverse range of devices. Graphics Processing Units (GPUs) can quickly, in the subsecond range, compute similarity with this method, and are accessible to web browsers in laptops, tablets, phones, and watches. This allows clause categories to be found inbrowser while the user is entering or editing them.

Figure 10:
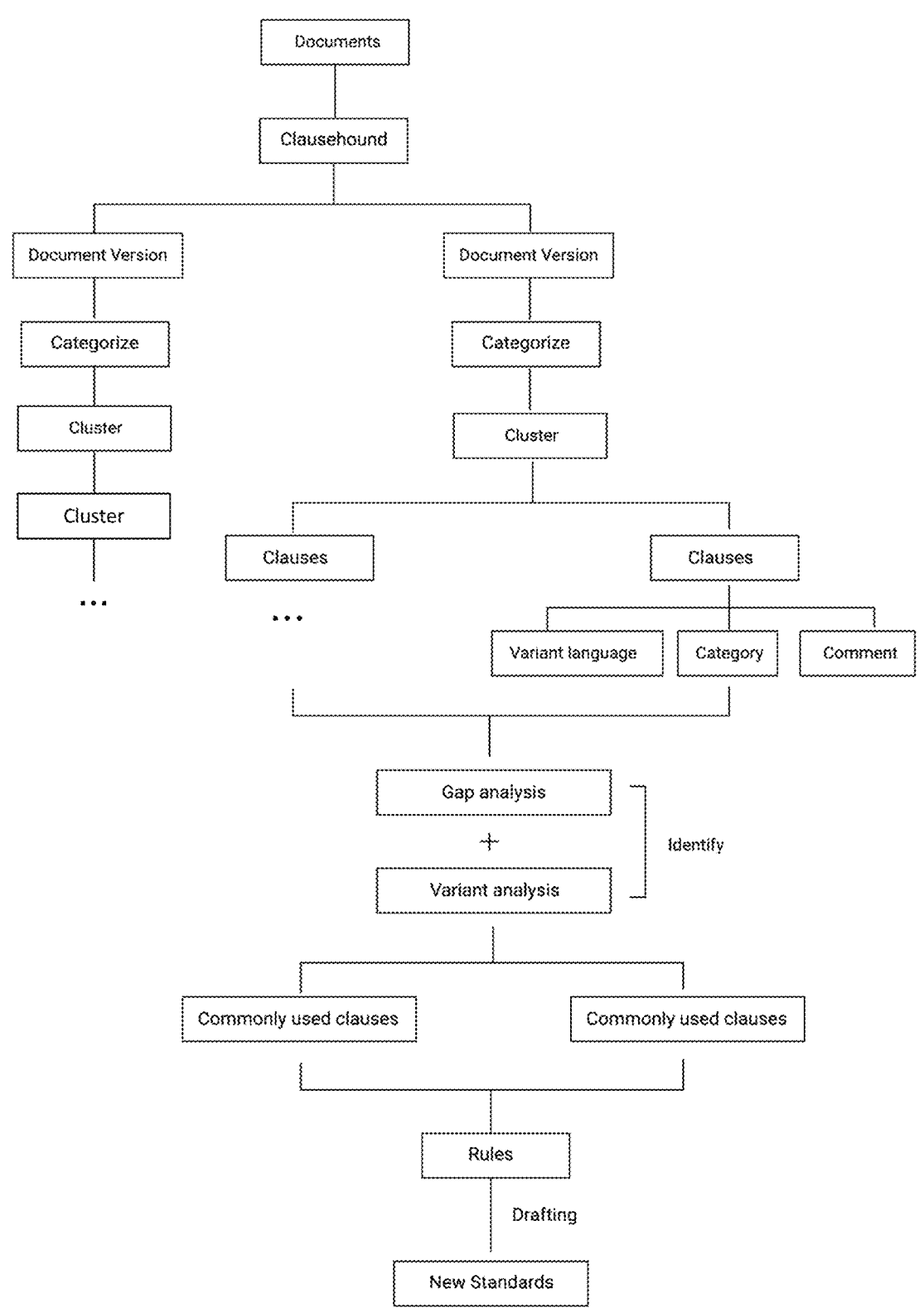
FIG. 10 is an example taxonomy architecture for clauses and clause clusters in a document and document set.

FIG. 10 is an example taxonomy architecture for clauses and clause clusters in a document and document set. As shown, clauses and clause clusters are tagged with metadata that identify their use and variants in a single document and across a document set. Clause and clause cluster versions, associations with other clauses and clause clusters, rules, comments, and other characterizing metadata provide context as well as use data on the incidence, use, versioning, and other aspects of each clause and clause cluster, as well as the associations therebetween. Having the wealth of taxonomic data associated with each clause and clause cluster enables tracking and informed use of each clause and clause cluster, as well as a platform for focused analysis of which clauses and clause clusters are being used, changed, and with what frequency. Other statistical tags can be assigned to clauses and clause clusters, including, for example, how many comments, versions, or rules are associated with each clause or clause cluster, which provides an indication of how hotly discussed or negotiated a particular clause or clause cluster is. It is evident that other metadata correlations can be compared within and between clause clusters that provide improved document and clause analysis and construction.

Figure 11:
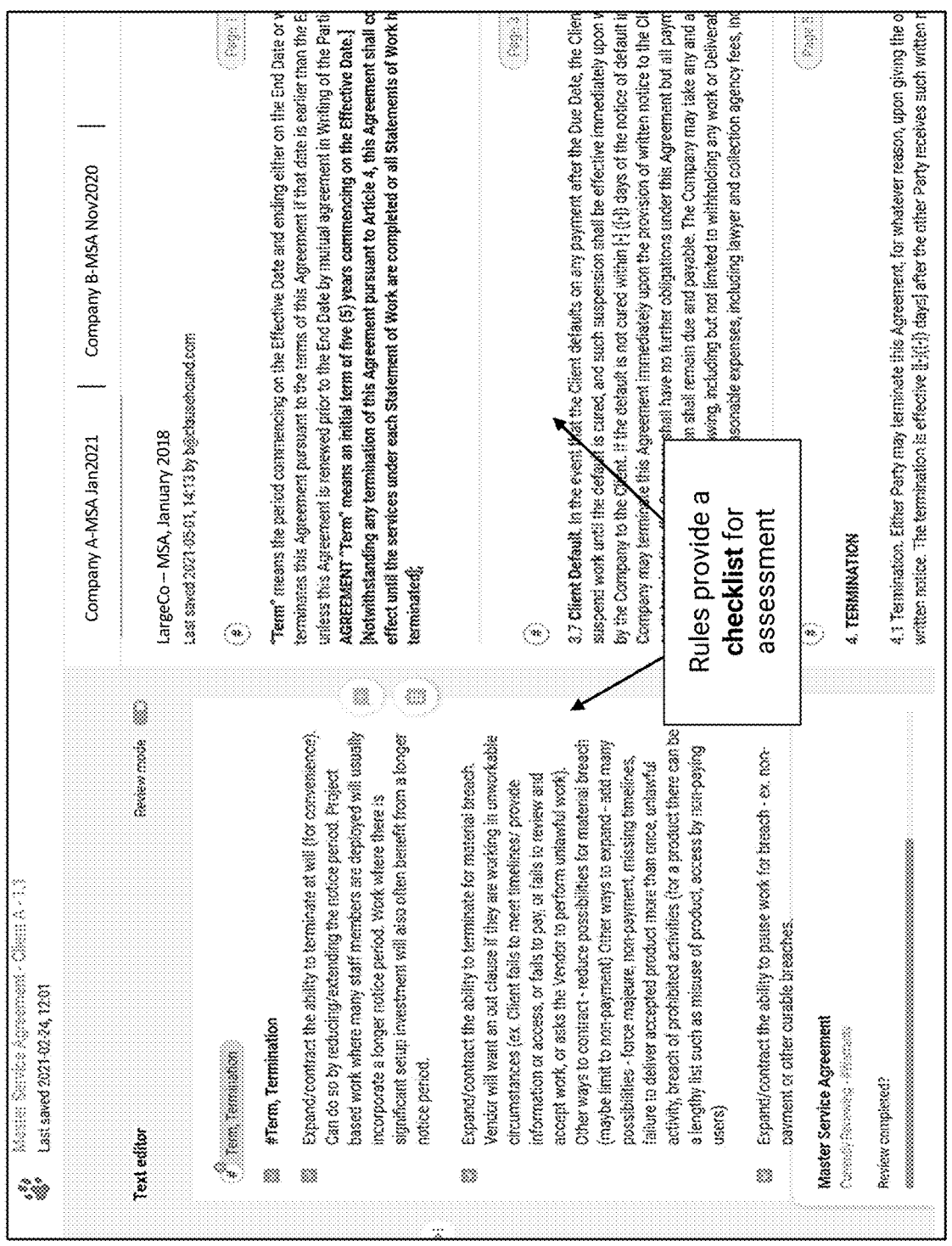
FIG. 11 is an example graphical user interface showing a clause taxonomy and analysis in a Master Service Agreement (MSA)

FIG. 11 is an example graphical user interface showing a clause taxonomy and analysis in a Master Service Agreement (MSA). In the text editor section of the graphical user interface is shown information on the clause classification or clause cluster "#Term, Termination" including knowledge and rules for the document drafter on the meaning and rationale for certain phrases in the clause cluster and selection thereof. The rules can be based in legal precedent, but can also include company or organization rules and precedents based on prior legal analysis and risk tolerance. The right side of the graphical user interface provides two precedent MSA documents, one internally from Company A and a second external document from Company B, with example language for each clause. The document 'Company A-MSA Jan2021' may serve as the organizational precedent for the document category, with flexibility based on the desired terms and negotiation of the particular MSA being constructed or analyzed. The rules provide a checklist for assessment of the use of each clause and textual flexibility within the clause for adaptation to a particular negotiation.

Figure 12:
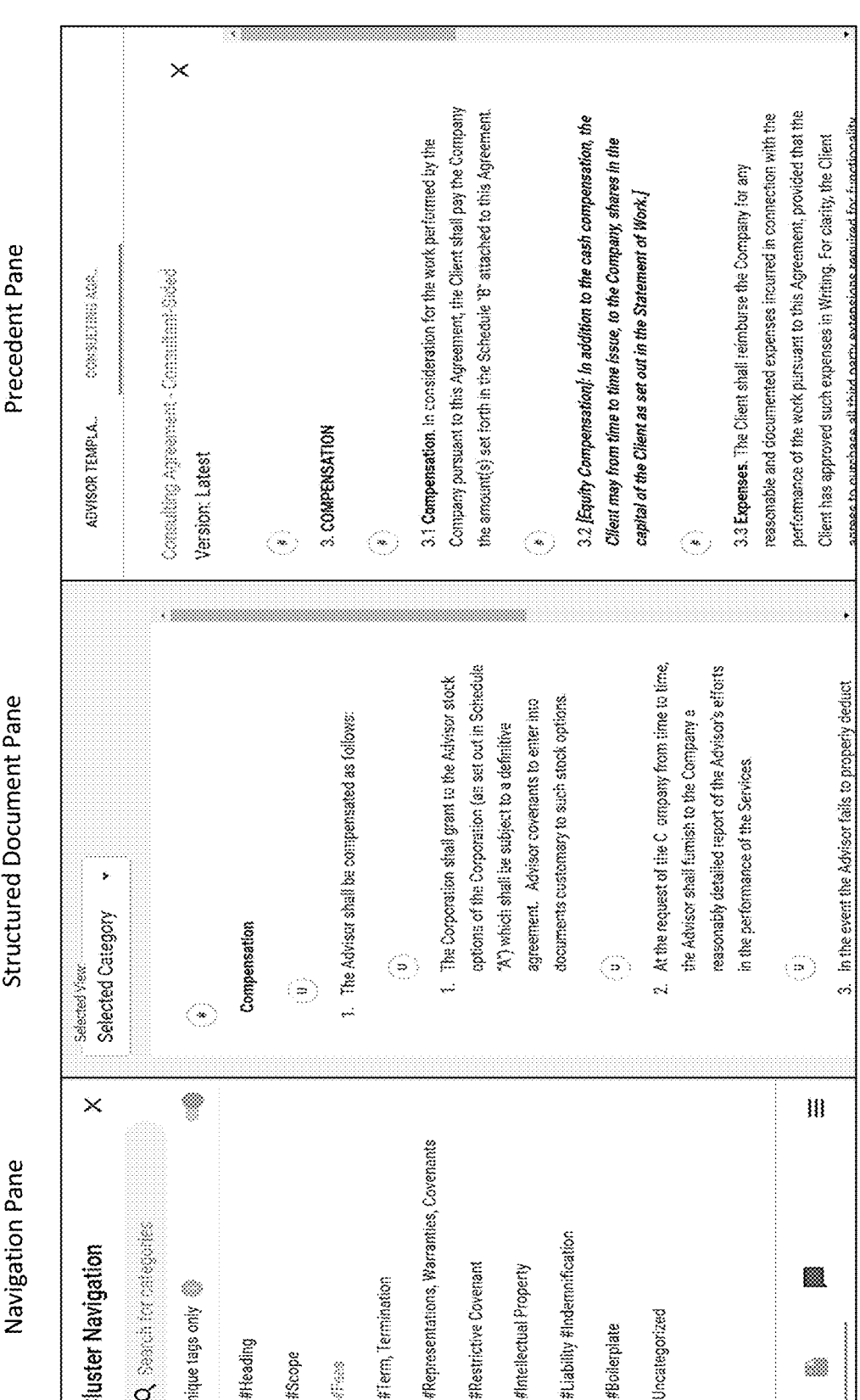
FIG. 12 is an example graphical user interface showing a clause taxonomy and cluster navigation for construction and analysis of a Consulting Agreement.

FIG. 12 is an example graphical user interface showing a clause taxonomy and cluster navigation for construction and analysis of a Consulting Agreement. The Cluster Navigation Pane provides a cluster category taxonomy for the document category "Consulting Agreement" with standard clause cluster categories (#Heading; #Scope; #Fees, #Term, Termination; #Representatinos, Warranties, Covenants; #Restrictive Covenant; #Intellectual Property; #Liability; #Indemnification; #Boilerplate; and Uncategorized Clauses) that are found in a standard consulting agreement. In a second Structured Document Pane the document under construction or analysis can be presented along with the selected or active clauses and the clause category that each clause belongs to. In the example shown the clause category is #Fees, and the clause cluster title is 'Compensation'. A third Precedent Pane is shown that provided other consulting agreements from a document library with similar clause categories and clauses for comparison and consideration. The circular buttons below each clause identified with 'U' and '#' can provide additional mouse-over or drop-down information on clause metadata for further informing the document drafter.

FIG. 13 is an example graphical user interface showing clause metadata and analysis in a Mutual Nondisclosure Agreement (MNDA). As shown, during MNDA document construction and analysis the clause currently being considered can be shown in the Clause Pane along with relevant metadata on, for example, the clause cluster that the clause generally belongs to, rules of the organization on how the clause should be drafted, options for broadening or narrowing the clause, legal information on term and phrase flexibility, and notes for the document drafter. On an adjacent Precedent Pane the system can show documents in the internal document library or a precedent library that contain similar clauses. In the example shown the Precedent Pane contains four examples of MNDA documents in the document library from four different companies (Acme, Company B (CoB), Company C (CoC), and Company D (CoD)) that have all been pre-classified and all contain clauses similar to the clause under investigation for drafting or analysis in the Clause Pane. During document construction, for example, each clause in the structured document can be drafted using precedent clauses together with legal knowledge and rules, tailored to the particular requirements of the contract. For document drafting, the particular document to be drafted can be identified and a deal intake form can be created for the particular contract to capture decision-making for each subject or clause cluster in the document.

In use of the present system, during analysis or construction of a MNDA document prepared by Company A, the database of legal documents of Company A can be searched and similar documents with similar clauses can be brought forward in the system for comparison. Precedent libraries are ingested and document and clause analysis is done on each document to classify each document and analyze and classify the contents in each document by clause cluster, and clauses within each clause cluster. This analysis can also include multiple versions of the same document or contract which provides versioning data on how particular clauses were developed and changed during the document construction and negotiation process, as well as which clauses and what clause language was ultimately selected by the organization in the final draft. This historical knowledge provides clause precedents, but also legal rationale for why certain clauses were negotiated and amended before finalization. From this information an organization playbook can be developed based on organization rules.

In addition, for every document, metadata associated clauses in the document provide context from the original document drafter as to why certain drafting and word choice decisions were made, which can assist future document drafting by informing the analysis or drafting of a new document for Company A. In one example, if the document in progress is intended to be friendlier to the co-signing party, language from similar clauses in friendly agreements can be found and brought forward to the document drafter as already signed off and authorized precedents for similar agreements. In particular clauses, for example, the company may have a low tolerance risk policy of a firm term for non-disclosure, and this can be flagged for the document drafter as a required constraint of any new legal document that has disclosure limitations. Document rules can be drafted for inclusion for an MNDA playbook for Company A that ensures standards are complied with in all MNDA documents. For example, the playbook can include the following rules in an MNDA Heading/Background: Rule 1: <Remove> Anything that is not found in a standard NDA; Rule 2: <Remove> Audit Rights should be removed from the MNDA; Rule 3: Ensure that the MNDA purpose is to explore a business opportunity.

A mutual non-disclosure agreement (MNDA) playbook for Company A can contain Company A's standard MNDA language, broken down into assigned clusters. Rules can also be made to the Company A MNDA by cluster and cluster category, which outlines the standard clause clusters and clauses found in Company A's internal standard MNDA, along with the individual rules associated with each cluster's clause types. Within each of the cluster sections, precedent counterparty clause language can also be included, for the reviewer's reference. Clause type-specific fallback positions can also be provided that the reviewer may consider during the negotiations. These fallbacks are ever changing and thus will develop over time as more MNDAs are negotiated. Finally, escalation procedures can also be included to guide the reviewer on who is responsible for approving negotiation positions based on their assigned cluster. Along with the counterparty language, rules applied, customizations, and Company A and independent risk assessments can be detailed by deal. "Rules Applied" refers to the Company A rules that are taken into consideration when reviewing the counterparty cluster. Customizations refers to the differences noted between the counterparty's clause language, and Company A's standard clause language. Risk Assessments can detail the risk levels associated with the deal-specific negotiations, on a None (+0), Low (+25), Medium (+50), and High (+100) scale. Company A's Risk Assessment refers to the risk perceived by Company A staff, while Independent Assessment can refer to how other companies or external counsel perceive the risk. Risk can also be broken down into categories such as, for example, financial burden, time pressure, asset risk, and integrity of the contract.

The present system and method can also be used to establish a document clause playbook for organizations to enable faster, more consistent, and more reliable document analysis and construction. In an example, a set of Company-A standard clauses and counterparty clauses can be assembled as a part of a standard clause set for general legal documents or a particular document type in an organization. A playbook-based, technology-enabled draft and review database can be established within an organization that leverages only the best clause and clause cluster content within the organization's document collection to help create fast and repeatable responses to complex negotiations. The organization playbook can also be easily updated as more documents are created as more deals close, providing more clause standards to keep the organization's legal standards aligned for all contracts. One standard document structure and some examples of clauses in a mutual non-disclosure agreement (MNDA) can include, for example:

> #Company-A MNDA—Heading
> #Company-A MNDA—Representatives Authorized to Receive Confidential Information
> #Company-A MNDA—Definition of Confidential Information (Inclusions, Exclusions)
> #Company-A MNDA—Minimum Standard of Care
> #Company-A MNDA—Term/Termination
> #Company-A MNDA—Use of Confidential Information (Purpose of Disclosure)
> #Company-A MNDA—Boilerplate
> #Company-A MNDA—Liability/Indemnification
> #Company-A MNDA—Representations & Warranties
> #Company-A MNDA—Intellectual Property
> #Company-A MNDA—Misuse of Confidential Information (Unauthorized Use or Disclosure, Breach)
> #Company-A MNDA—Restrictive Covenant In an example, the Company A playbook for each category of structured document can include, for a particular clause or clause cluster: 1) the rationale and meaning behind a clause; 2) a standard Company A clause; 3) optional fallback positions of Company A for the clause or clause cluster; and 4) one or more standard or precedent clause used by one or more internal or external entities. Specifically, in the clause "#Company-A MNDA—Representatives Authorized to Receive Confidential Information", the system can provide, for 1) that "This clause determines whether the confidential information may be shared with the receiving party's representatives. The purpose of this is to limit the number of parties who need to receive confidential information and ensure that each party is subject to appropriate confidentiality obligations." A standard clause can then be provided as a precedent example, such as "Definition of Recipient and Disclosing Party: In this Agreement, the term "Recipient" shall mean, collectively, the party to which Confidential Information is disclosed, and all of its employees, officers, directors, affiliates, agents or representatives (collectively referred to as "Representatives"). The term "Disclosing Party" shall mean, collectively, the party that is disclosing Confidential Information and all of its employees, officers, directors, affiliates, agents or representatives." Finally, fall back positions for each flexible section of the clause as well as additional precedent clauses and clause language can be provided to illustrate other options should they be required during the deal negotiation. Organization playbooks can be accessible through the present system, or can be easily exported into a standard text editor.

The system as described is presently being used to analyze a multitude of legal documents from a variety of organizations. As more documents are added to the system the organizations using the system have access to contracts and structured documents classified by clause from similar companies, as well as established large companies whose contracts and clauses can be compared and used in existing and newly created structured documents. Explanatory comments for each clause in precedent documents can also be added as a teaching tool to provide background on clause drafting considerations for each clause, as well as flexibility for the particular contract requirements.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A computer-implemented method for structured document analysis comprising:

segmenting a structured document into a plurality of clauses;

parsing each of the plurality of clauses from the structured document, each clause comprising clause text and a clause taxonomy comprising contextual metadata and extrinsic metadata associated with each clause, the parsing comprising using natural language processing of the clause text and a multidimensional mapping of the clause taxonomy to provide a vector description of each clause defining a relationship between clause taxonomy and clause text;

classifying each of the plurality of clauses in the structured document by clause cluster by classifying the structured document by document category and matching each of the plurality of clauses in the structured document to a standard clause category in the document category in a clause library by comparing the vector description of each of the plurality of clauses to vector descriptions of other clauses and clause clusters in the clause library, the clause library in a clause database comprising a plurality of previously classified clauses from a plurality of classified structured documents;

displaying, on a graphical user interface, a particular clause in the structured document next to at least one clause from the clause library from at least one of the plurality of previously classified structured documents with a similar vector description and in the same clause category as the particular clause along with the contextual metadata and extrinsic metadata relevant to the at least one clause from the clause library;

identifying a weak clause from the plurality of clauses that presents a potential risk in the structured document; and providing an alert to the weak clause on the graphical user interface with a set of clause rules to avoid the potential risk, the clause rules based on the extrinsic metadata and contextual metadata of the clause and comprising a rationale for certain phrases in the clause category and at least one previously classified clause in the standard clause category from the clause library.

2. The method of claim 1, wherein segmenting the structured document into a plurality of clauses comprises identifying one or more of a carriage return, comma, semi colon, period, conjunction, paragraph structure, and other punctuation.

3. The method of claim 1, wherein parsing each of the plurality of clauses is done using word to vector analysis to identify vector based clauses and clause clusters in the structured document.

4. The method of claim 1, wherein the method identifies the absence of one or more standard clause categories in the structured document.

5. The method of claim 1, further comprising tracking versioning of each clause in the structured document to previous versions of the same clause category in the clause library by comparing the clause with previous clause variants having similar extrinsic metadata or intrinsic metadata.

6. The method of claim 1, further comprising performing a gap analysis between at least one of the plurality of clauses or clause clusters in the structured document and similar clauses and clause clusters in the clause library of classified clauses and clause clusters and identifying one or more of a missing clause, missing clause cluster, and missing clause variant.

7. The method of claim 1, wherein the structured document is a legal document, contract, sales proposal, policy document, agreement, court case, report, scientific paper, or online text.

8. The method of claim 1, wherein the weak clause is matched to the at least one standard clause based one or more organization rule, legal decision, and legal jurisprudence.

9. The method of claim 1, further comprising editing clause text of one of the plurality of clauses in the structured document and updating the clause taxonomy of the clause based on the editing.

10. The method of claim 1, wherein the extrinsic metadata associated with each clause comprises one or more of an occurrence of particular language, misuse of language, clause category occurrence, type of document, importance of document, inconsistencies within document, internally conflicting language, a conflict situation within clauses in the document, a conflict situation between clauses in the document, clause category, legal precedents, external comments on the clause, external history of use of the clause, gap analysis of potentially missing clauses or clause clusters, and clause variants.

11. The method of claim 1, wherein the contextual metadata for each clause comprises one or more of firm identification, author identification, editor identification, editing timestamp, drafting timestamp, clause edit history, document location, internal discussion, comments, answers, escalations, rule development, comparing against a rule, internal approval of the clause, internal disapproval of the clause, notes on improvements to be made to that clause, and document occurrence identification.

12. The method of claim 1, wherein the potential risk is a loophole that may result in illegality or unenforceability, a procedural risk caused by introducing inadequately researched or improperly or unclearly defined terms or clauses, an external regulatory risk, an internal contractual risk, or a negotiation risk.

13. The method of claim 1, wherein the potential risk is classified by a risk level category comprising one or more of financial burden, time pressure, asset risk, and integrity of the contract.

14. The method of claim 1, wherein the clause rules are based on one or more of legal precedent, organization rules, and organization precedents based on prior legal analysis and risk tolerance.

15. The method of claim 1, wherein the weak clause comprises one or more of use or misuse of language, document inconsistency, internally conflicting language, internally conflicting situation, prior dispute over clause or clause cluster language, disapproval of the clause, notes on improvements to be made to the clause, and document occurrence identification.

16. A system for constructing a structured document comprising:

a clause library comprising a plurality of clauses classified by clause category and clause clusters classified by cluster category, each clause and clause cluster comprising a clause taxonomy comprising contextual metadata and extrinsic metadata associated with each clause;

a clause parsing engine comprising a natural language processing algorithm for parsing clauses and clause clusters in a structured document to identify the clause category to which the clause belongs and a multidimensional map of the clause taxonomy for each parsed clause in the structured document to provide a vector description of the clause comprising one or more vector expressions defining the relationship between clause taxonomy and clause text, the clause taxonomy comprising contextual metadata, and extrinsic metadata for the parsed clause;

a clause matching engine for matching parsed clauses and clause clusters to similar clauses and clause clusters in the clause library using the vector description of the clauses and clause clusters which incorporates the clause and clause cluster taxonomy, the clause library in a clause database comprising a plurality of previously classified clauses from a plurality of classified structured documents; and a graphical user interface for displaying the structured document deconstructed into clauses and clause clusters in the structured document next to similar clauses and clause clusters from the clause library from at least one of the plurality of previously classified structured documents to identify at least one weak clause in the structured document that presents a potential risk based on the contextual metadata and extrinsic metadata relevant to the at least one weak clause, and providing an alert to the at lease one weak clause on the graphical user interface with a set of clause rules, the clause rules based on the extrinsic metadata and contextual metadata of the at least one weak clause and comprising a rationale for certain phrases in the clause category and at least one previously classified clause in the standard clause category from the clause library to avoid the potential risk.

17. The system of claim 16, wherein each clause and clause cluster has one or more document type that the clause and clause cluster can be applied to.

18. The system of claim 16, wherein the system identifies the absence of one or more clause categories in the document and clause variants that presents the potential risk in the document.

19. The system of claim 16, further comprising a translation database matching each of the plurality of clauses with clauses having the same intent in another language.

20. A system for structured document analysis comprising:

at least one processor; and at least one non-transitory memory storing instructions that, when executed by the at least one processor, cause the system to perform operations comprising:

segmenting a structured document into a plurality of clauses;

parsing each of the plurality of clauses from the structured document, each clause comprising clause text and a clause taxonomy comprising contextual metadata and extrinsic metadata associated with each clause, the parsing comprising using natural language processing of the clause text and a multidimensional mapping of the clause taxonomy to provide a vector description of each clause defining a relationship between clause taxonomy and clause text;

classifying each of the plurality of clauses in the structured document by clause cluster by classifying the structured document by document category and matching each of the plurality of clauses in the structured document to a standard clause category in the document category in a clause library and comparing the vector description of each of the plurality of clauses to vector descriptions of other clauses and clause clusters in the clause library, the clause library in a clause database comprising a plurality of previously classified clauses from a plurality of classified structured documents;

displaying, on a graphical user interface, a particular clause in the structured document next to at least one clause from the clause library from at least one of the plurality of previously classified structured documents with a similar vector description and in the same clause category as the particular clause along with the contextual metadata and extrinsic metadata relevant to the at least one clause from the clause library;

identifying a weak clause from the plurality of clauses that presents a potential risk in the structured document; and providing an alert to the weak clause on the graphical user interface with a set of clause rules, the clause rules based on the extrinsic metadata and contextual metadata of the clause and comprising a rationale for certain phrases in the clause category and at least one previously classified clause in the standard clause category from the clause library to avoid the potential risk.

* * * * *